(12) United States Patent
Adamczyk et al.

(10) Patent No.: US 11,060,573 B2
(45) Date of Patent: Jul. 13, 2021

(54) BRAKE CARRIER

(71) Applicant: KNORR-BREMSE Systeme fuer Nutzfahrzeuge GmbH, Munich (DE)

(72) Inventors: Philipp Adamczyk, Stoettwang (DE); Matthias Klingner, Moorenweis (DE); Akbar Hassani, Dachau (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/948,083

(22) Filed: Apr. 9, 2018

(65) Prior Publication Data

US 2018/0223929 A1   Aug. 9, 2018

Related U.S. Application Data

(63) Continuation of application No. PCT/EP2016/074155, filed on Oct. 10, 2016.

(30) Foreign Application Priority Data

Oct. 9, 2015 (DE) .................. 10 2015 117 285.2
Mar. 17, 2016 (DE) .................. 10 2016 104 967.0

(51) Int. Cl.
*F16D 65/097* (2006.01)
*F16D 55/226* (2006.01)
(Continued)

(52) U.S. Cl.
CPC ......... *F16D 55/226* (2013.01); *F16D 55/224* (2013.01); *F16D 65/0056* (2013.01);
(Continued)

(58) Field of Classification Search
CPC ......... F16D 65/0056; F16D 2055/0008; F16D 65/0978; F16D 65/183; F16D 55/226
See application file for complete search history.

(56) References Cited

U.S. PATENT DOCUMENTS 3,920,104 A   11/1975 Hoffmann
4,491,204 A    1/1985 Dirauf et al.
(Continued)

FOREIGN PATENT DOCUMENTS

CN   101571169 A   11/2009
CN   102105720 A    6/2011
(Continued)

OTHER PUBLICATIONS

International Search Report (PCT/ISA210) issued in PCT Application No. PCT/EP2016/074155 dated Jan. 31, 2017 with English translation (eight pages).
(Continued)

*Primary Examiner* — Xuan Lan Nguyen
(74) *Attorney, Agent, or Firm* — Crowell & Moring LLP

(57) ABSTRACT

A one-piece brake carrier for a vehicle disc brake is provided. The brake carrier has a frame-like disc wrap-around element which has two mutually parallel bridge struts, and two frame sections arranged parallel to a brake disc rotation axis and connecting the bridge struts. The brake carrier further has a securing flange by which the brake carrier is fixable to an axle flange. One or both of the frame sections, starting from a side of the brake carrier away from the securing flange widens toward an outer edge of the securing flange.

24 Claims, 17 Drawing Sheets

(51) Int. Cl.
*F16D 65/18* (2006.01)
*F16D 65/00* (2006.01)
*F16D 55/224* (2006.01)
*F16D 65/092* (2006.01)
*F16D 65/095* (2006.01)
*F16D 55/00* (2006.01)

(52) U.S. Cl.
CPC ......... *F16D 65/092* (2013.01); *F16D 65/095* (2013.01); *F16D 65/097* (2013.01); *F16D 65/0974* (2013.01); *F16D 65/0978* (2013.01); *F16D 65/183* (2013.01); *F16D 2055/0008* (2013.01); *F16D 2055/0029* (2013.01)

(56) References Cited

U.S. PATENT DOCUMENTS

| | | | | |
|---|---|---|---|---|
| 7,458,447 | B2* | 12/2008 | Thomas | F16D 55/226 188/205 A |
| 7,815,022 | B2* | 10/2010 | Aydt | F16D 55/00 188/71.1 |
| 8,701,841 | B2* | 4/2014 | Crippa | F16D 55/228 188/370 |
| 9,097,304 | B2 | 8/2015 | Plantan et al. | |
| 2011/0186391 | A1 | 8/2011 | Gruber et al. | |
| 2012/0222925 | A1 | 9/2012 | Kaneko | |
| 2014/0000991 | A1* | 1/2014 | Bull | F16D 55/226 188/72.1 |
| 2014/0048360 | A1 | 2/2014 | Plantan et al. | |
| 2014/0196992 | A1 | 7/2014 | Iraschko | |
| 2015/0008078 | A1 | 1/2015 | Asen et al. | |
| 2016/0208870 | A1 | 7/2016 | Rguichi et al. | |

FOREIGN PATENT DOCUMENTS

| | | |
|---|---|---|
| CN | 203023344 U | 6/2013 |
| CN | 103527681 A | 1/2014 |
| CN | 104254705 A | 12/2014 |
| CN | 104583630 A | 4/2015 |
| DE | 10 2008 027 049 A1 | 12/2009 |
| DE | 10 2013 110 159 A1 | 3/2014 |
| DE | 10 2013 016 312 A1 | 4/2015 |
| EP | 0 752 541 A1 | 1/1997 |
| EP | 2 570 689 B1 | 8/2015 |
| RU | 2 087 769 C1 | 8/1997 |
| SU | 1254223 A1 | 8/1986 |
| WO | WO 2008/079086 A1 | 7/2008 |

OTHER PUBLICATIONS

German-language Written Opinion (PCT/ISA/237) issued in PCT Application No. PCT/EP2016/074155 dated Jan. 31, 2017 (six pages).

Chinese-language Office Action issued in counterpart Chinese Application No. 201680069530.9 dated May 15, 2019 with English translation (13 pages).

Russian-language Office Action issued in counterpart Russian Application No. 2018116807/11(026169) dated Jan. 18, 2019 with English translation (15 pages).

Hindi-language Office Action issued in Indian Application No. 201837012609 dated Feb. 27, 2020 with English translation (seven (7) pages).

German-language Office Action issued in German Application No. 10 2016 104 967.0 dated Mar. 16, 2021 (five (5) pages).

* cited by examiner

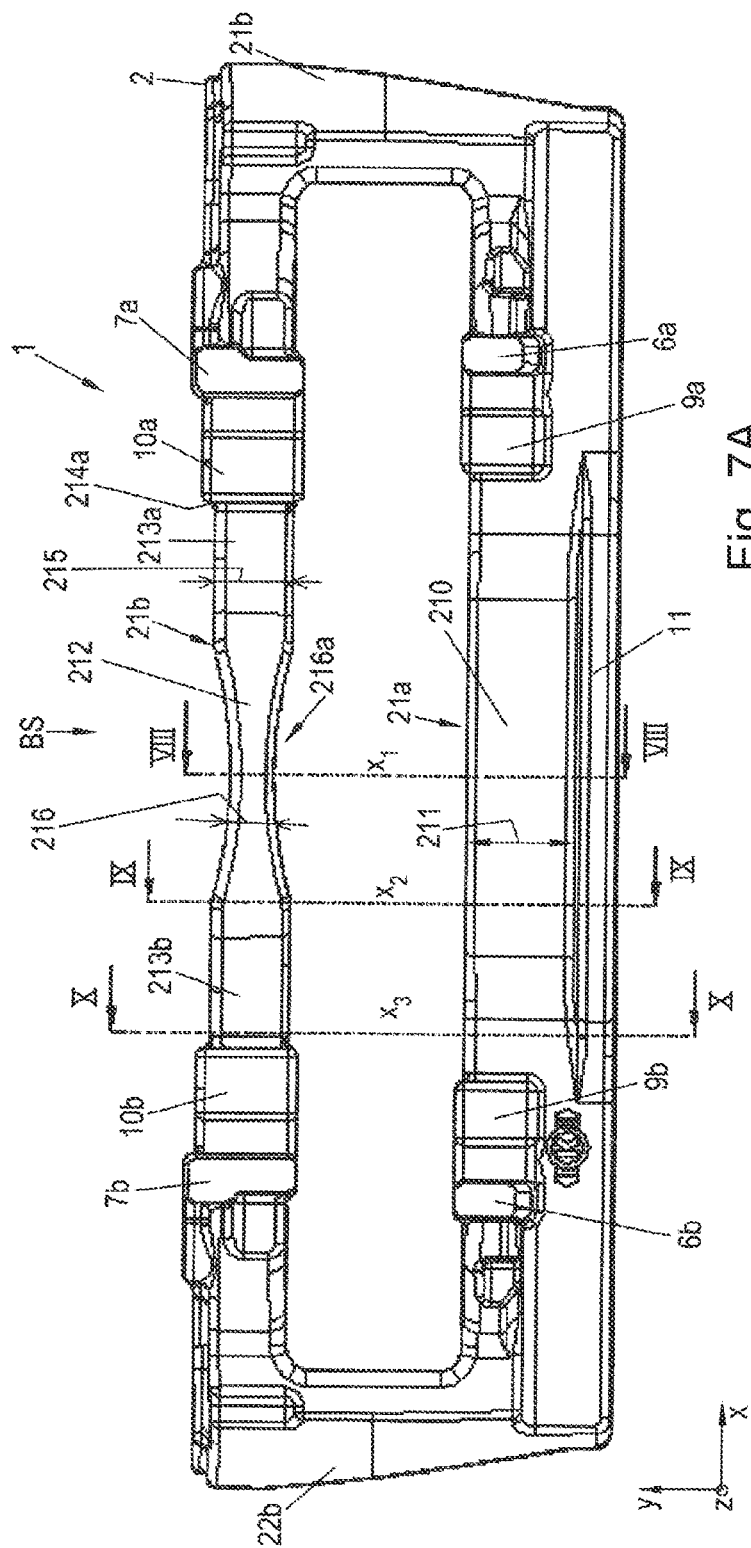
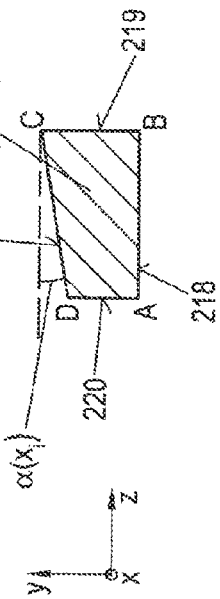
Fig. 7
Fig. 7A

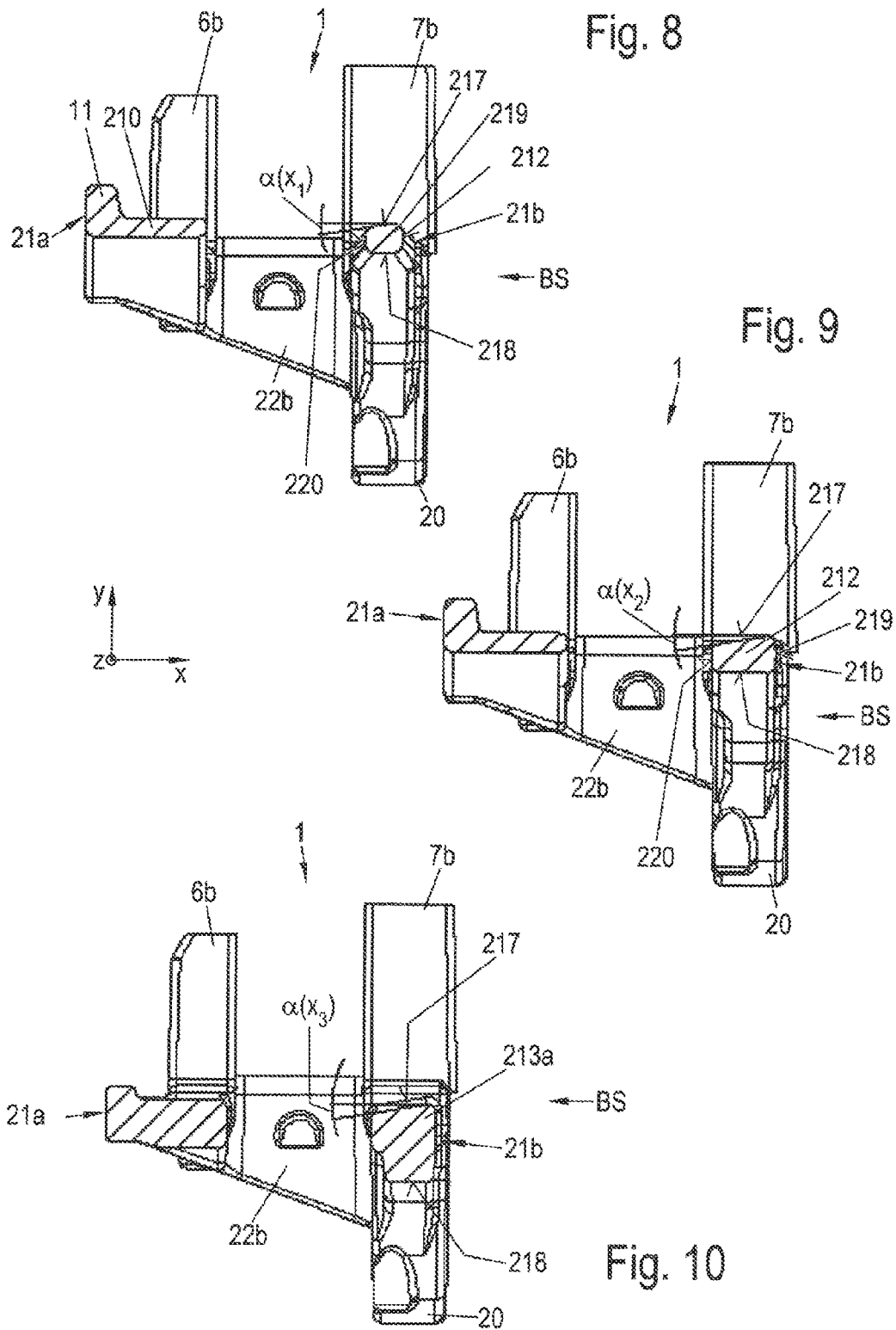

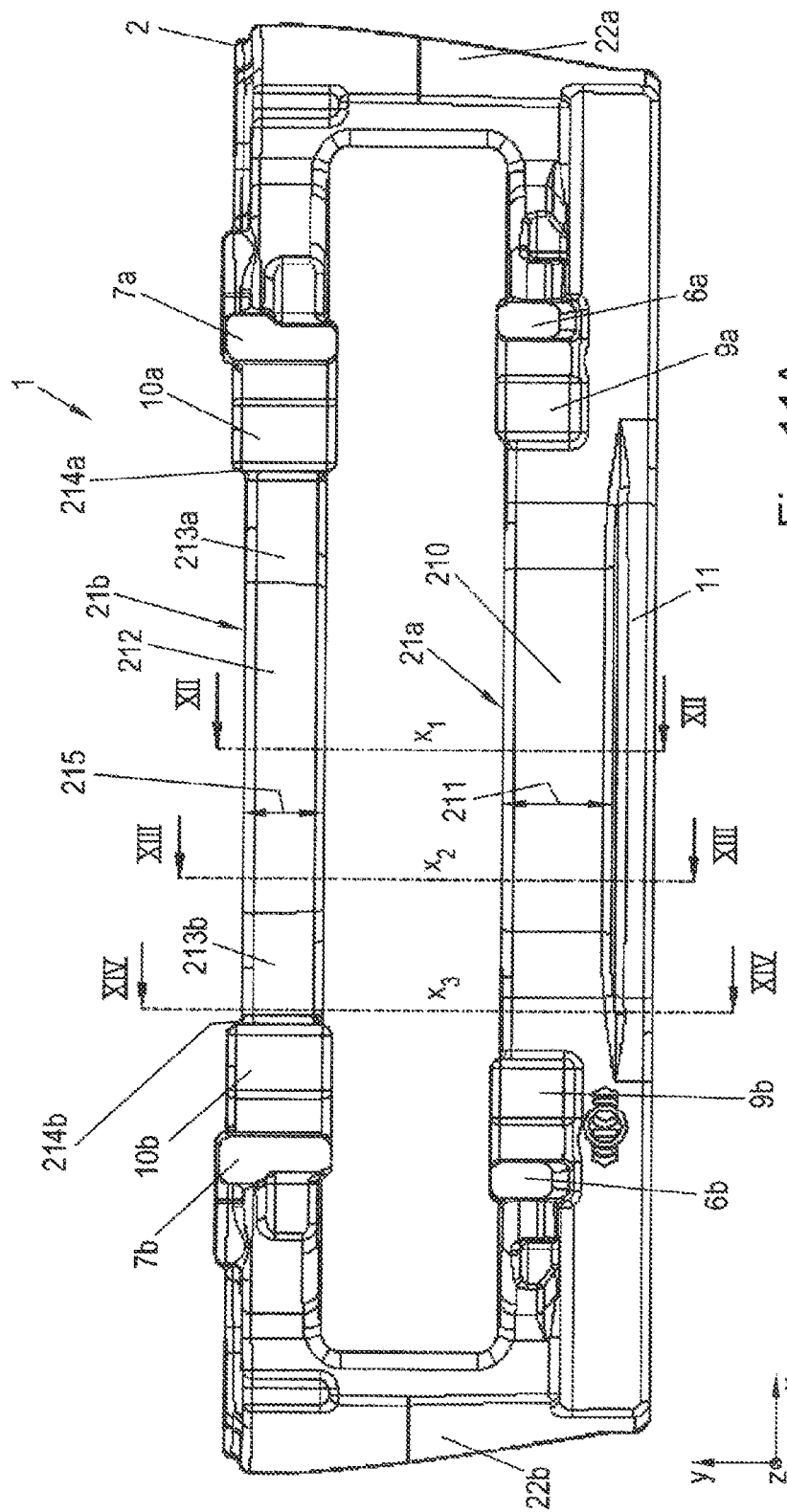
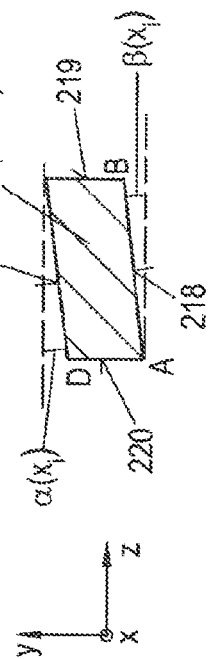
Fig. 11
Fig. 11A

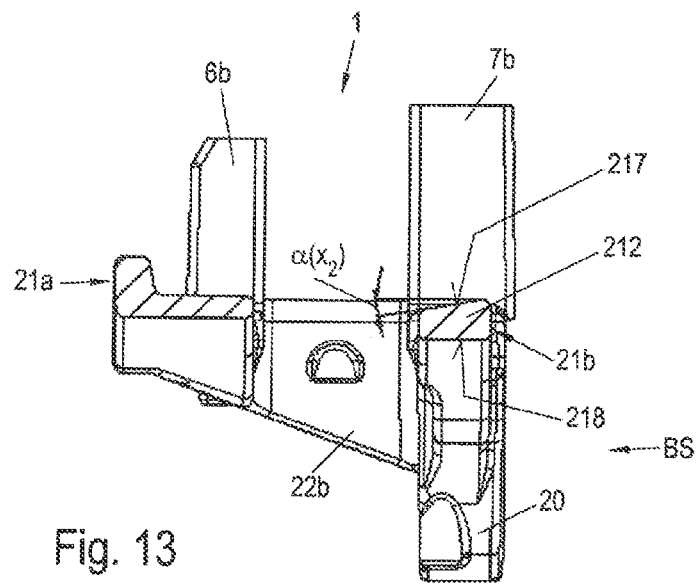
Fig. 13
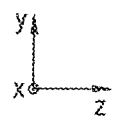
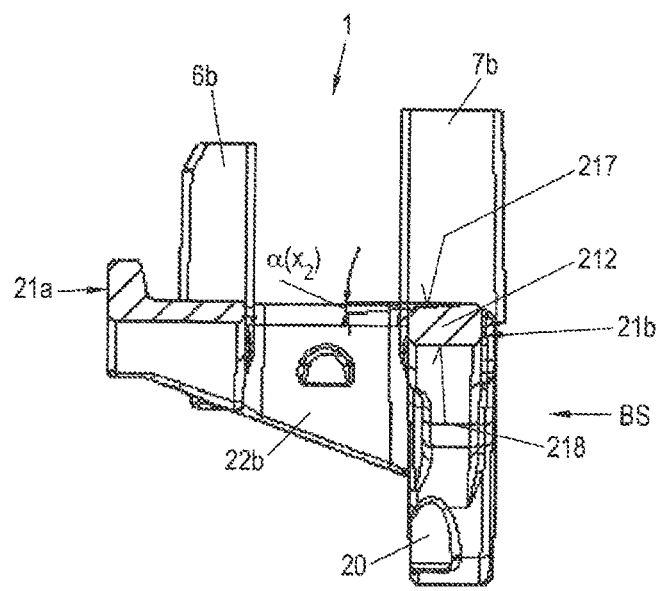
Fig. 13A

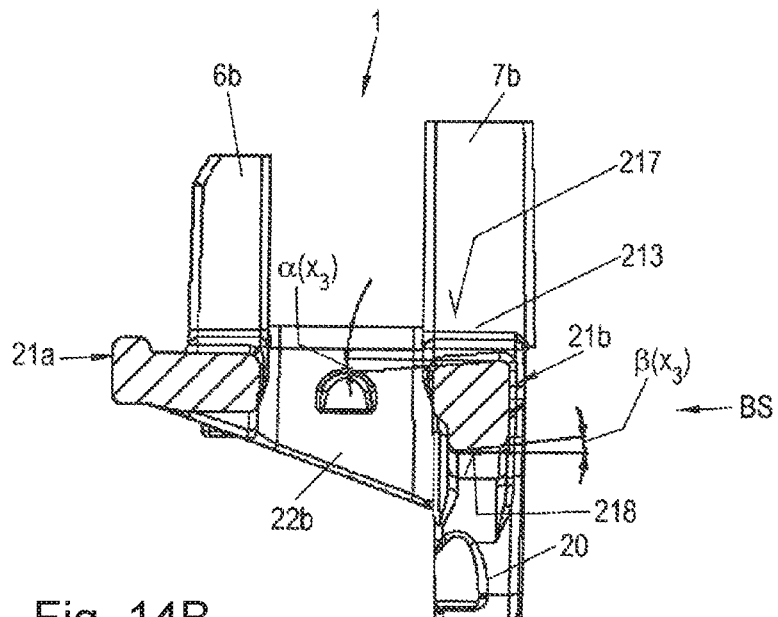
Fig. 14B
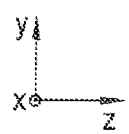
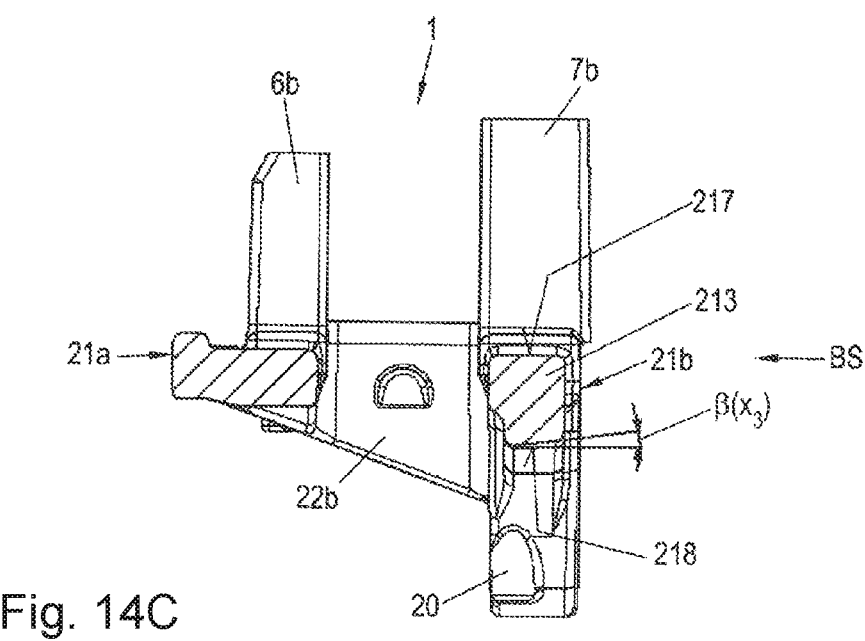
Fig. 14C

BRAKE CARRIER

CROSS REFERENCE TO RELATED APPLICATIONS

This application is a continuation of PCT International Application No. PCT/EP2016/074155, filed Oct. 10, 2016, which claims priority under 35 U.S.C. § 119 from German Patent Applications Nos. 10 2015 117 285.2, filed Oct. 9, 2015, and 10 2016 104 967.0, filed Mar. 17, 2016, the entire disclosures of which are herein expressly incorporated by reference.

BACKGROUND AND SUMMARY OF THE INVENTION

The present invention relates to a brake carrier for a disc brake.

Brake carriers of the type in question for disc brakes are produced integrally, preferably by a primary forming process, preferably by sand casting, wherein cast iron containing spheroidal graphite or spheroidal graphite iron is preferably used as the material. The cast blank produced in such a manner is subsequently finished partially by machining, thus resulting in an installable brake carrier. Integral brake carriers of this type have basically proven successful, but should be developed even further. Due to the strength requirements imposed on the brake carrier and due to a constricted construction space for the brake carrier and the resulting, previous geometrical configuration, the brake carriers according to the prior art thus have a relatively high weight which should provide further potential for optimization.

DE 10 2013 110 159 A1 describes a brake carrier of the type in question (see FIG. 16) which, at least on a side facing away from the fastening flange and outward with respect to a disc-encompassing portion, has a reinforcement rib which protrudes or is raised from the brake carrier in the axial direction with respect to a brake-disc axis of rotation. The reinforcement rib is designed as a continuous contour line. The continuous contour line in each case has a profile which preferably rises continuously from two outer ends toward a central axis of symmetry. The brake carrier described in DE 10 2013 110 159 A1 does indeed already have a relative low weight. Nevertheless, it is desirable, in particular also with regard to a further optimization of the payload of a commercial vehicle, to provide a brake carrier which is further optimized in terms of weight and therefore also costs in relation to the prior art, in particular for commercial vehicle brakes.

The invention is therefore based on the object of providing an improved brake carrier with a low weight and at the same time improved stress distribution.

According to the invention, the disc-encompassing portion of the brake carrier is designed on its radial outer side with respect to the brake disc, i.e. on the respective frame portion of the brake carrier, in such a manner that little material is used, but the brake carrier nevertheless has sufficient rigidity. Using in each case entirely or at any rate a substantially triangular configuration of the frame portion, a low weight is achieved here.

An integral brake carrier according to the invention for a disc brake of a vehicle, having a brake disc, includes a frame-like disc-encompassing portion which has two mutually parallel bridge struts and two frame portions which are arranged parallel to a brake-disc axis of rotation and connect the bridge struts, and a fastening flange at which the brake carrier is fastenable to an axle flange of a vehicle axle. Starting from a side of the disc-encompassing portion that faces away from the fastening flange, one or both of the frame portions is/are in each case widened as far as an outer edge of the fastening flange of the brake carrier in such a manner that the widening is in the form of an increase in distance with respect to a plane of the disc-encompassing portion.

In one embodiment, one or both of the frame portions is/are widened in such a manner that, in each case starting from that side of the disc-encompassing portion that faces away from the fastening flange, a geometrical element is in each case formed as far as an outer edge of the fastening flange of the brake carrier.

According to a preferred embodiment, the geometrical element is triangular, wherein that side of the frame portion which faces the fastening flange in each case forms a shortest side of the triangular geometrical element. Within each case triangular configuration of the frame portion, weight is saved in an advantageous manner. The respective frame portion is configured in such a manner that that side of the frame portion which faces the fastening flange in each case forms the shortest side of the triangle, the rigidity of the brake carrier is advantageously not reduced on said side, while, on that side of the frame portion which faces away from the fastening flange, weight can advantageously be saved by the triangular configuration of the frame portion since the stiffening of the component on this side is taken over by other geometrical elements of the brake carrier.

Alternatively, that side of the frame portion which faces the fastening flange in each case forms a long base side of the trapezoidal geometrical element. It is provided both in the case of the triangular and in the case of the trapezoidal geometrical element that one or both of the frame portions has/have a lower edge which has a rectilinear profile without steps. As a result, stress distribution to the frame portions, including a weight reduction, can take place uniformly.

In a further preferred variant, the brake carrier can in each case have two carrier horns on a side of the brake carrier that face away from the fastening flange, and can in each case have two carrier horns on a side of the brake carrier that face the fastening flange. The two carrier horns in each case preferably have an L-shaped cross section on that side of the brake carrier which faces the fastening flange. With the L-shaped cross section, the carrier horns obtain a loading appropriate geometry in an advantageous manner on that side of the brake carrier which faces the fastening flange, with optimum use of the material.

In one embodiment, the two limbs of the respectively L-shaped cross section of the carrier horns can be designed to be thicker than the carrier horns on that side of the brake carrier which faces away from the fastening flange.

The brake carrier preferably has a reinforcement rib which comprises a central, curved rib portion and two rib portions having a rectilinear profile, and has a closed contour line, on its outer side facing away from the fastening flange. The reinforcement rib thus advantageously stiffens that side of the brake carrier which faces away from the fastening flange.

In a further embodiment, it is provided that the contour line of the reinforcement rib in each case begins at two ends on the frame portion of the brake carrier with a respective rib portion having a rectilinear profile and in each case first runs parallel under a plane or in the plane of a base surface of the disc-encompassing portion and then, with the central rib portion, follows the bridge strut on its side facing away from the fastening flange or outer side and runs as far as a plane of symmetry "S" of the brake carrier. A uniform reinforcement and stress distribution can therefore arise.

In yet another embodiment, the central, curved rib portion of the reinforcement rib extends between those sides of the disc-encompassing portion which face the carrier horns in an arc-shaped manner, in particular in a circular-arc-shaped manner, in the region of an axle-engaging-over portion, which can likewise bring about a uniform stress distribution and reinforcement.

A further improvement in the uniformity of stress distribution and reinforcement can take place by the fact that the reinforcement rib is formed mirror-symmetrically with respect to the plane of symmetry "S".

For this purpose, the reinforcement rib can also be positioned in such a manner that it is arranged above fastening points of the brake carrier.

It is advantageous if the brake carrier has pockets. With the reduction in wall thickness in the region of the pockets, material and therefore weight is advantageously saved. In one embodiment, these pockets can be arranged in the region of the fastening points below carrier horns on the brake-disc-facing side of that side of the disc-encompassing portion which faces the fastening flange. As a result, even further advantages in respect of vibration behavior can arise.

According to another preferred embodiment, the brake carrier has one or more apertures. The apertures are advantageously arranged at points of the brake carrier having low deformation and therefore low mechanical stress, and advantageously act in a weight-reducing manner without increasing the mechanical stress in the region of the apertures in the brake carrier by stress concentration. Furthermore, the apertures advantageously serve for removing heat from the brake pads and from the brake disc into the surroundings. In addition, a center of gravity of the brake carrier can therefore be displaced further inward, as a result of which a natural frequency of the brake carrier can be increased in order to improve a noise, vibration, harshness (NVH) behavior. For this purpose, in a further embodiment, the two apertures can be arranged mirror-symmetrically with respect to the plane of symmetry "S", as a result of which a uniformity in the reduction of the NVH behavior can be increased.

In a further preferred embodiment of the invention, a clear width "$W_1$" of the brake pad slot formed by the carrier horns arranged facing away from the fastening flange is greater than a clear width "$W_2$" of the brake pad slot formed by the carrier horns arranged facing the fastening flange. With the reduced clear width "$W_2$" of the brake pad slot arranged facing the fastening flange, the rigidity on that side of the brake carrier which faces the fastening flange is advantageously increased and therefore the mechanical stresses are likewise advantageously reduced in this region of the brake carrier. As a result, wall thicknesses can correspondingly be reduced and weight can advantageously be saved.

In one embodiment, at least one of the mutually parallel bridge struts is provided with at least one side tilted by an angle. The advantage can thereby be achieved that local stresses are reduced since the stresses are distributed in a sheet-like manner over the bridge strut.

In one embodiment, it is provided for this purpose that the bridge strut facing the fastening flange is provided with the at least one side tilted by an angle.

It is preferred here, in one embodiment, that an upper side of the bridge strut facing the fastening flange is tilted at an angle to an imaginary horizontal plane which lies parallel to a plane of the disc-encompassing portion.

Alternatively or additionally, a lower side of the bridge strut facing the fastening flange can also be tilted at an angle to an imaginary horizontal plane which lies parallel to a plane of the disc-encompassing portion.

In one embodiment, it is provided that the angle has a value which lies within a range of approximately 1° to 20°, preferably 5° to 12°.

Alternatively, a value of the angle may also be variable over the length of the bridge strut facing the fastening flange.

The value of the angle is selected here in such a manner that material can be removed or saved in the region of the stress concentrations. As a result, a weight of the brake carrier is advantageously also reduced, with it simultaneously being possible to have a positive influence on an NVH behavior.

For this purpose, in a further embodiment, at least one of the mutually parallel bridge struts has at least one constriction which can already be formed during the manufacturing or else retrospectively.

A disc brake of a vehicle has the above-described brake carrier. The overall weight of the disc brake is thereby kept low.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 shows a top view of a second embodiment of the brake carrier according to the invention.

FIG. 7A shows a schematic cross-sectional illustration of a bridge strut from FIG. 7.

FIGS. 8-10 show sectional illustrations of the second embodiment of the brake carrier according to the invention according to FIG. 7.

FIG. 11 shows a top view of a variant of the second embodiment of the brake carrier according to the invention according to FIG. 7.

FIG. 11A shows a further schematic cross-sectional illustration of the bridge strut of FIG. 11.

FIGS. 12-14 show sectional illustrations of the brake carrier according to FIG. 11.

FIGS. 12A-12C, 13A-13C, 14A-14C show further sectional illustrations of the brake carrier according to FIG. 11.

DETAILED DESCRIPTION OF THE DRAWINGS

In the following, expressions such as "top", "bottom", "right", "left" etc. are used, which relate to the orientation of the brake carrier according to FIG. 2. A Cartesian system of coordinates in the figures serves for further orientation.

FIGS. 1-6 are illustrations of an embodiment of a brake carrier 1 according to the invention. The brake carrier 1 is preferably formed integrally. It is preferably produced by a primary forming process, particularly preferably by casting, wherein use is preferably made of a ductile type of cast iron, particularly preferably of cast iron containing spheroidal graphite.

Figure 6:
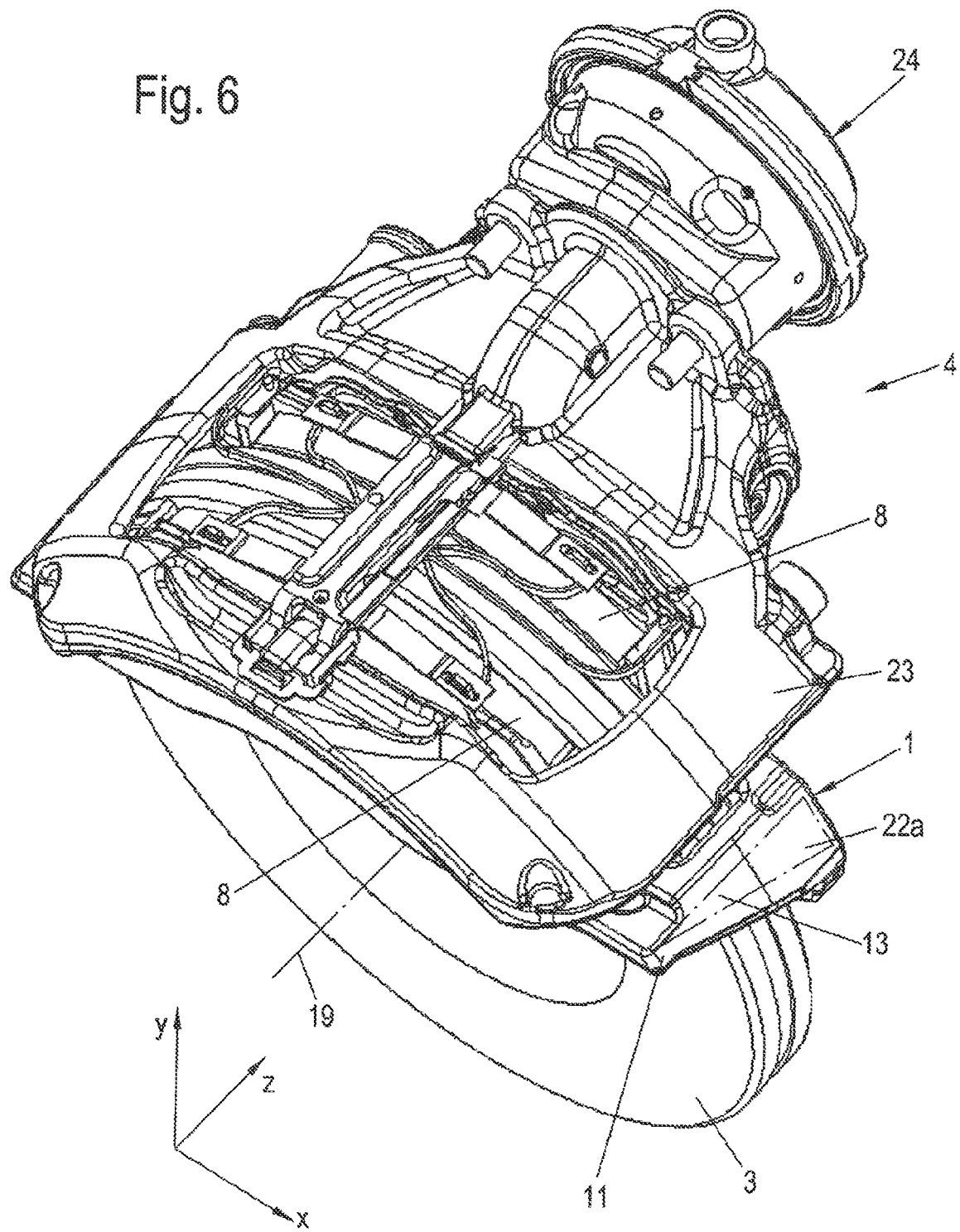
FIG. 6 shows a disc brake, into which a brake carrier according to the invention according to FIG. 1 is installed.

The brake carrier 1 spans or encompasses in the manner of a frame, as what is referred to as a disc-encompassing portion 2 or disc frame, a radially outer portion, with respect to a vehicle wheel axle/brake-disc axis of rotation 19, of a brake disc 3, which is connected to a vehicle axle for rotation therewith, of the disc brake 4 (see in this respect FIG. 6). The disc-encompassing portion 2 lies in an x-z plane below a base surface 5 (explained in more detail below) of the brake carrier 1. A plane of the disc-encompassing portion 2 is therefore a plane parallel to the base surface 5. The disc-encompassing portion 2 comprises two mutually parallel bridge struts 21a, 21b and two frame portions 22a, 22b which are arranged parallel to a brake-disc axis of rotation 19 and in each case connect the bridge struts 21a, 21b to each other at their ends.

One of the bridge struts 21a, 21b is in each case arranged on both sides of the brake disc 3 parallel with or spaced apart in the axial direction from the brake disc 3.

The bridge struts 21a, 21b have a substantially rectilinear form which, in the region of the axle-engaging-over portion or hub-engaging-over portion, spans said portion in an arcuate manner. The bridge struts 21a, 21b are thus colloquially also referred to in each case as an arc-like hub arch 21a, 21b. The two bridge struts 21a, 21b are connected to each other parallel to the brake-disc axis of rotation 19 or spaced apart in the radial direction with respect to the brake disc 3 via frame portions 22a, 22b, to form the disc-encompassing portion 2.

One of the bridge struts 21b lies on a fastening side BS of the brake carrier 1, on which side the brake carrier 1 has a fastening flange 20 which can be fastened to an axle flange. This side of the brake carrier 1 is called the side facing the fastening flange below, whereas the other side of the brake carrier 1 is referred to as the side facing away from the fastening flange. Accordingly, the bridge strut 21b arranged on the fastening side BS is called the bridge strut 21b facing the fastening flange, while the other bridge strut 21a is referred to as the bridge strut 21a facing away from the fastening flange. The axle flange is in each case arranged at one end of a vehicle axle. The fastening flange 20 of the brake carrier 1 is accordingly stabilized on the vehicle axle.

The brake carrier 1 furthermore has two carrier horns 6a, 6b or 7a, 7b with respective support walls 26a, 26b and 27a, 27b on each side of the brake disc 3. Overall, there are therefore four of the carrier horns 6a, 6b and 7a, 7b. They are formed integrally with the disc-encompassing portion 2. The carrier horns 6a, 6b which are arranged on that side of the brake carrier 1 which faces away from the fastening flange are also referred to as outer carrier horns 6a, 6b, whereas the carrier horns 7a, 7b arranged on that side of the brake carrier 1 which faces the fastening flange are referred to as inner carrier horns.

The carrier horns 6a, 6b and 7a, 7b extend upward in a positive y direction from the frame portions 22a, 22b, starting from a surface or plane referred to by definition as the base surface 5. Said base surface 5 lies here in an x-z plane and therefore at right angles to a plane of the brake disc 3. The carrier horns 6a, 6b and 7a, 7b are preferably arranged symmetrically here with respect to in each case one of the bridge struts 21a, 21b and furthermore preferably lie one behind another in the circumferential direction in a plane parallel to the frictional surface or a plane of the brake disc 3. The carrier horns 6a, 6b and 7a, 7b serve for supporting and guiding brake pads 8 of the disc brake 4 (see in this respect FIG. 6).

The two inner carrier horns 7a, 7b each have an L-shaped cross section. In addition, the two outer carrier horns 6a, 6b preferably each also have an L-shaped cross section. The "L" is in each case oriented in the direction of the brake pads (not illustrated here) in order to form support points in the radial direction and in the circumferential direction for said brake pads.

An elongate recess 28a, 28b is in each case formed at the ends of the inner support walls 27a and 27b that merge into the base surface 5, said recess extending in the z direction substantially over the entire width, i.e. in the z direction, of the respective support wall 27a, 27b. Said recesses can serve for saving weight and improving a noise, vibration, harshness (NVH) behavior.

Figure 1:
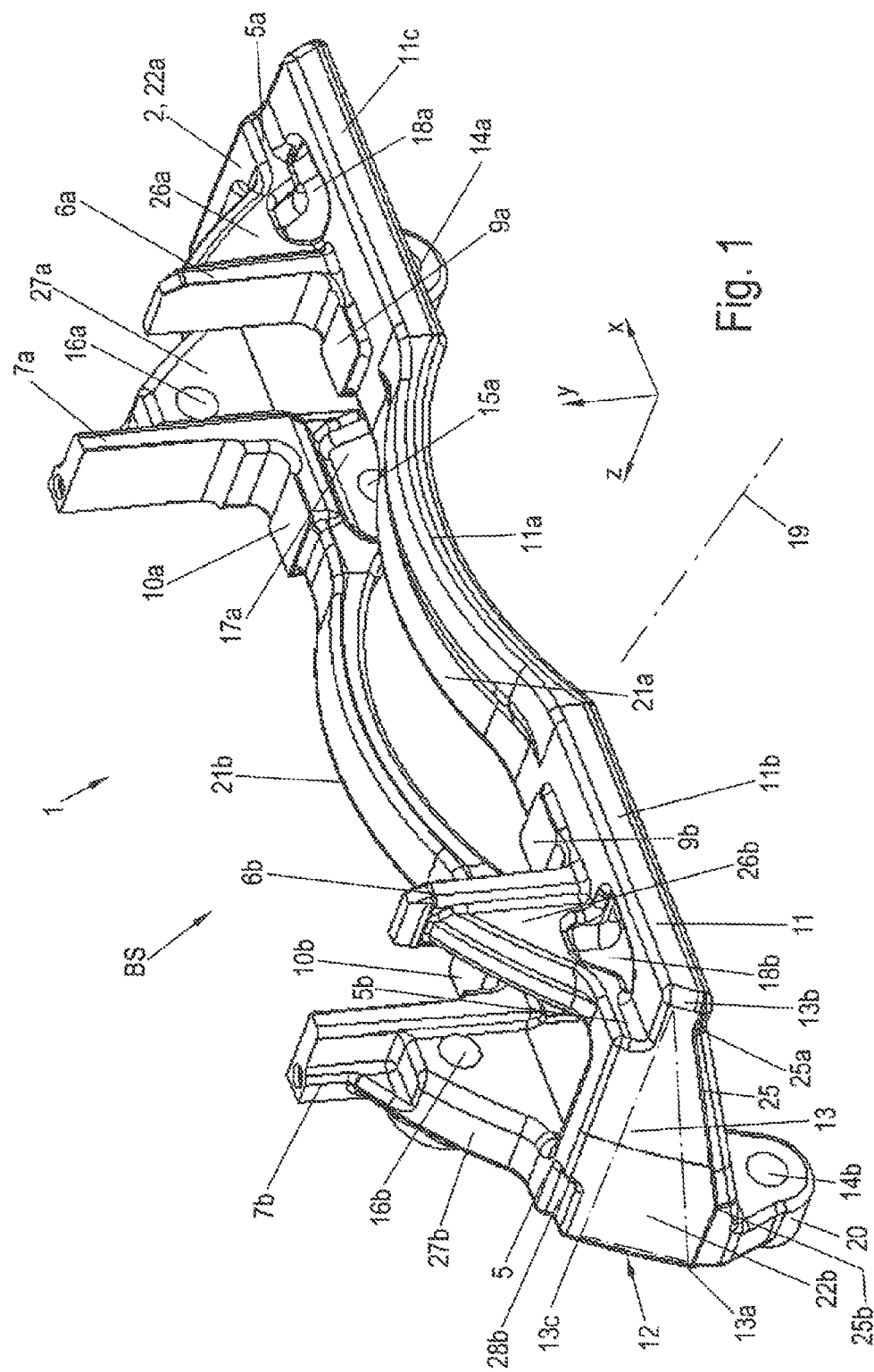
FIG. 1 shows a three-dimensional isometric illustration of a first embodiment of a brake carrier according to the invention.

It is readily recognizably illustrated in FIG. 1 that the two limbs of the respective L-shaped cross section of the inner carrier horns 7a, 7b are designed to be wider, thicker and higher than the limbs of the outer carrier horns 6a, 6b. With the L-shaped cross section, the inner carrier horns 7a, 7b advantageously obtain a load-meeting geometry, with optimum use of material.

The carrier horns 6a, 6b and 7a, 7b together with lower support points 9a, 9b and 10a, 10b, respectively, of the brake carrier 1 in each case form one of two brake pad slots which each guide and support a pad carrier plate of a brake pad 8 (see FIG. 6) in the circumferential direction, i.e. on the run-in side and run-out side and also downward.

The bridge strut 21a facing away from the fastening flange is widened on its longitudinal side, which points outward, i.e. in a negative z direction, by a reinforcement rib 11 in such a manner that a width of the bridge strut 21a facing away from the fastening flange is increased in the direction of the brake-disc axis of rotation 19 or in the negative z direction. The disc-encompassing portion 2 thereby merges directly into the reinforcement rib 11.

Said reinforcement rib 11 comprises a central, curved rib portion 11a which is convex with respect to the brake-disc axis of rotation 19, and two rib portions 11b and 11c which have a substantially rectilinear profile in the direction of the x axis. Each end of the central rib portion 11a is in each case connected to one of the rib portions 11b, 11c having a rectilinear profile. This results in a closed contour line of the reinforcement rib 11, which will be explained in more detail below.

The frame portions 22a, 22b each connect the ends of the bridge struts 21a, 21b in the plane of the disc-encompassing portion 2. An end of a respective frame portion 22 that faces away from the fastening flange is connected here on a side of the disc-encompassing portion 2 that faces away from the fastening flange to the respective end of the bridge strut 21a facing away from the fastening flange. On the fastening side BS, at the end of the respective bridge strut 21b facing the fastening flange, at least one or preferably both of the frame portions 22a, 22b is or are widened or extended downward in such a manner that a portion is formed here which has an entirely or substantially triangular geometrical element 13 with three corner points 13a, 13b and 13c. This is illustrated in particular in FIG. 3.

In other words, one or preferably both of the frame portions 22a, 22b is/are widened in each case over a course starting from the corner point 13*b* on that side of the disc-encompassing portion 2 which faces away from the fastening flange in each case as far as the corner point 13*c* on an outer edge 12 of the fastening side BS of the brake carrier 1 in such a manner that the widening is realized in the form of an increase in the distance with respect to the plane of the disc-encompassing portion 2. The widening is thus greatest at the outer edge 12, wherein a distance of the corner point 13*a* at this point from an imaginary connecting line of the corner points 13*b* and 13*c* or the plane of the disc-encompassing portion 2 is greatest.

The triangular geometrical element 13 here is a right-angled triangle with the corner points 13*a*, 13*b* and 13*c*, legs a, b and the hypotenuse c. That side of the frame portion 22*a*, 22*b* which faces the fastening flange in each case forms a shortest side between the corner points 13*a* and 13*c* of the triangular geometrical element 13 than the one leg b. The other leg a is formed by a connection of the corner points 13*c* and 13*b*. The corner point 13*b* of the triangular geometrical element 13 lies at the respective free end of the respective rectilinear rib portion 11*b*, 11*c* of the reinforcement rib 11 and is connected to the corner point 13*a* in order to form the hypotenuse c of the right-angled triangle. The hypotenuse c can be displaced parallel as far as a lower edge 25 of the respective frame portion 22*a*, 22*b*.

The edge 25 extends between a, for example arcuate, transition portion 25*a* on the reinforcement rib 11 as far as a further, for example also arcuate, transition portion 25*b* on the fastening flange 20. Approximately perpendicularly below the center (as seen in the z direction) of the inner carrier horn 7*b*, the edge 25 runs rectilinearly here, beginning at the lower transition portion 25*b*, obliquely upward in the positive y direction without steps and further in the negative z direction between the inner carrier horn 7*b* and the outer carrier horn 6*b*, and further under the outer carrier horn 6*b* as far as the upper transition portion 25*a*. The upper end of the edge 25 therefore lies outside the outer carrier horn 6*b* in the region of the connection of the rectilinear rib portion 11*b* of the reinforcement rib 11, as can also be seen in FIG. 1.

The geometrical element 13 may also be considered to be a trapezoidal geometrical element 13'. The trapezoidal geometrical element 13' forms a right-angled trapezoid with the corner points 13'*a*, 13'*b*, 13'*c*, 13'*d* and with the base sides b and b', and also limbs a and c'. This can best be seen from FIG. 3. In this case, the connection of the corner points 13'*a* and 13'*c* forms that side of the frame portion 22*a*, 22*b* which faces the fastening flange and at the same time forms the long base side b' of the trapezoidal geometrical element 13', as is easily conceivable.

The connection of the corner point 13'*c* of the base side b' to the corner point 13'*b* and the connection of the other corner point 13'*a* of the base side to the corner point 13'*d* form the limbs a' and c' of the trapezoid. The one limb a' runs here parallel to the brake-disc axis of rotation 19 between the corner points 13'*c* and 13'*b*.

The other limb c' of the trapezoidal geometrical element 13' between the corner points 13'*a* and 13'*d* runs obliquely upward from the lower corner point 13'*a* to the corner point 13'*d*, is partially indicated by dashed lines and lies in the edge 25.

In the case of the trapezoidal geometrical element 13', the upper corner point 13'*d* lies at the upper end of the oblique limb in the upper transition portion 25*a* of the edge 25. The corner point 13'*b* is located vertically above the upper corner point 13'*d*, wherein the connection of the corner points 13'*b* and 13'*d* forms the short base side b' of the trapezoid.

The frame portion 22*b* (or 22*a*) can therefore either be considered to be a triangular geometrical element 13 or a trapezoidal geometrical element 13'. In the case of the trapezoidal geometrical element 13', a rectangle with the corner points 13'*b*, 13*b*, 13*d*, 13'*d*, which is attached to the short base side b' of the trapezoidal geometrical element 13', substantially forms, for example in a projection onto a y-z plane, a substantial part of a cross section of the reinforcement rib 11.

The leg a as connection of the corner points 13*c*, 13*b* of the triangular geometrical element 13 encloses, with the hypotenuse c as connection of the corner points 13*a*, 13*b*, an angle which lies within a range of 15° to 45°, preferably within a range of 15° to 25°. The legs b (13*a*-13*c*) and a (13*c*-13*b*) are therefore at a certain ratio to one another and to the hypotenuse c (13*a*-13*b*), which ratio is substantially determined by the formulae of the right-angled triangle of the triangular geometrical element 13. For the trapezoidal geometrical element 13', the corresponding laws of such a trapezoid can also be used for the configuration.

The respectively triangular or trapezoidal and therefore advantageously weight-saving configuration of the frame portion 22*a*, 22*b* is possible by a solid and therefore stiff and therefore low-deformation configuration of the reinforcement rib 11. As a result, it is no longer required, in contrast to the brake carriers according to the prior art, to draw down the frame portion 22*a*, 22*b* of the disc-encompassing portion 2, in each case on that side of the brake carrier 1 which faces away from the fastening flange, as far as possible in the direction of small or negative y values with respect to the system of coordinates in FIG. 1, in order thereby to provide the brake carrier 1 with the required rigidity or the required resistance against deformation.

The support points 9*a*, 9*b* and 10*a*, 10*b* each support the brake pad 8*a*, 8*b* on the brake carrier 1 in the y direction with respect to the system of coordinates in FIG. 1, wherein the support points 9*a*, 9*b* and 10*a*, 10*b* at the same time define the distance of the respective brake pad 8 from the vehicle axis.

Bearing bolts for a brake caliper 23, which is designed as a sliding caliper, are fastenable to fastening points 16*a*, 16*b* of the support walls 27*a*, 27*b* of the inner carrier horns 7*a*, 7*b* (see FIG. 6). This is known per se to a person skilled in the art and will therefore not be described in more detail here.

The brake carrier 1 is a preferably symmetrical component with respect to the plane of symmetry "S" (see FIG. 2) which is defined between the y axis and the z axis of the system of coordinates in FIG. 1 or parallel thereto. Said brake carrier has the reinforcement rib 11 for stiffening purposes on its outer side which faces away from the fastening flange and extends in its longitudinal direction in the x direction parallel to a plane of the brake disc 3.

The reinforcement rib 11 has a contour line which is continuous over the entire surface of the outer side of the brake carrier 1 that faces away from the fastening flange, wherein the upper sides of the rectilinear rib portions 11*a* and 11*b* of the reinforcement rib 11 are offset downward, i.e. in the negative y direction, with respect to the base surface 5. As a result, a step 5*a*, 5*b* is in each case formed and is in each case connected to a partial portion of the underside of a respective support wall 26*a*, 26*b* of each outer carrier horn 6*a*, 6*b*.

In FIG. 1, the contour line of the reinforcement rib 11 begins at the left free end of the left rectilinear rib portion 11*b* in the region of the corner point 13*b* of the triangular geometrical element 13 on the frame portion 22*a*, 22*b* of the brake carrier 1. Starting therefrom, said contour line in each case initially runs parallel under a plane or in the plane of the console-like base surface 5 of the disc-encompassing portion 2 with respect to the system of coordinates in FIG. 1 inward in the direction of x values which are smaller or greater in amount, or continues toward the center as a rectilinear rib portion 11*b*. The contour profile of the reinforcement rib 11 then follows the convex central rib portion 11*a* toward the center and therefore follows the shape of the arcuate bridge strut 21*b* on its outer side (i.e. on its outer side facing away from the brake disc) as far as the plane of symmetry "S" (see FIG. 2) and further as far as the right end of the central rib portion 11*a*, where the contour profile then follows the right rectilinear rib portion 11*c* as far as the free end thereof. The reinforcement rib 11 is formed mirror-symmetrically with respect to the plane of symmetry "S". The reinforcement rib 11 advantageously stiffens that side of the brake carrier 1 which faces away from the fastening flange.

The reinforcement rib 11 is positioned in such a manner that it is arranged above the fastening points 14*a*, 14*b* and 15*a*, 15*b* of the brake carrier 1. As a result, in the region of the carrier horns 6*a*, 6*b*, said reinforcement rib is arranged just below the plane or in the plane of the base surface 5 of the disc-encompassing portion 2. The effect achieved by this arrangement is an advantageous short introduction of force and torque into the reinforcement rib 11, and therefore significant stiffening of that side of the brake carrier 1 which faces away from the fastening flange is achieved by the reinforcement rib 11.

Using a correspondingly dimensioned thickness of the reinforcement rib 11 to utilize the maximum available construction space, a large amount of material of the brake carrier 1 in a plane parallel to the x-y plane with respect to the system of coordinates in FIG. 1 is brought outward into a position as far away as possible from the disc-encompassing portion 2. As a result, the second-degree geometrical moment of inertia that is particularly relevant for deformation under operating loading is advantageously configured to be of an appropriate size with respect to a deformation axis lying parallel to the Y axis of the system of coordinates in FIG. 1. This advantageously permits a specific reduction in wall thicknesses in the region of the disc-encompassing portion 2.

In this connection, the brake-disc-facing side of that side of the disc-encompassing portion 2 which faces the fastening flange in each case has pockets 17*a*, 17*b* in the region of the fastening points 15*a*, 15*b* below the carrier horns 7*a*, 7*b*. The pockets significantly reduce the thickness or the wall thickness of the brake carrier 1 at these points. With the reduction in wall thickness in the region of the pockets 17*a*, 17*b*, material and therefore weight is advantageously saved.

The term "pocket" means a flat recess bounded by one or more walls and a base, in contrast to a groove, within a geometrical element of a component. Using the pocket 17*a*, 17*b*, the thickness of the geometrical element is reduced in the region of the pocket 17*a*, 17*b*.

It is likewise clearly illustrated in FIG. 1 that the base surface 5 has an aperture 18*a* in the respective step 5*a*, 5*b*, and the rectilinear rib portions 11*a* and 11*b* of the reinforcement rib 11 each have an aperture 18*b* in the region of the carrier horns 6*a*, 6*b* on that side of the brake carrier 1 which faces away from the fastening flange. The two apertures 18*a*, 18*b* also each extend in a positive y direction into the respective support wall 26*a*, 26*b* of the associated outer carrier horn 6*a*, 6*b* and are arranged mirror-symmetrically with respect to the plane of symmetry "S" (see FIG. 2). The apertures 18*a*, 18*b* are advantageously arranged at points of the brake carrier 1 of low deformation and therefore of low mechanical stress and advantageously have a weight-reducing effect without increasing the mechanical stress in the region of the apertures 18*a*, 18*b* in the brake carrier 1 by stress concentration. Furthermore, the apertures 18*a*, 18*b* advantageously serve for removing heat from the brake pads 8 and from the brake disc 3 into the surroundings. In addition, the apertures 18*a*, 18*b* can have an improving influence on a noise, vibration, harshness (NVH) behavior since, by means of the apertures 18*a*, 18*b*, the center of gravity of the brake carrier 1 is displaced inward and the natural frequency of the brake carrier 1 can rise.

Figure 2:
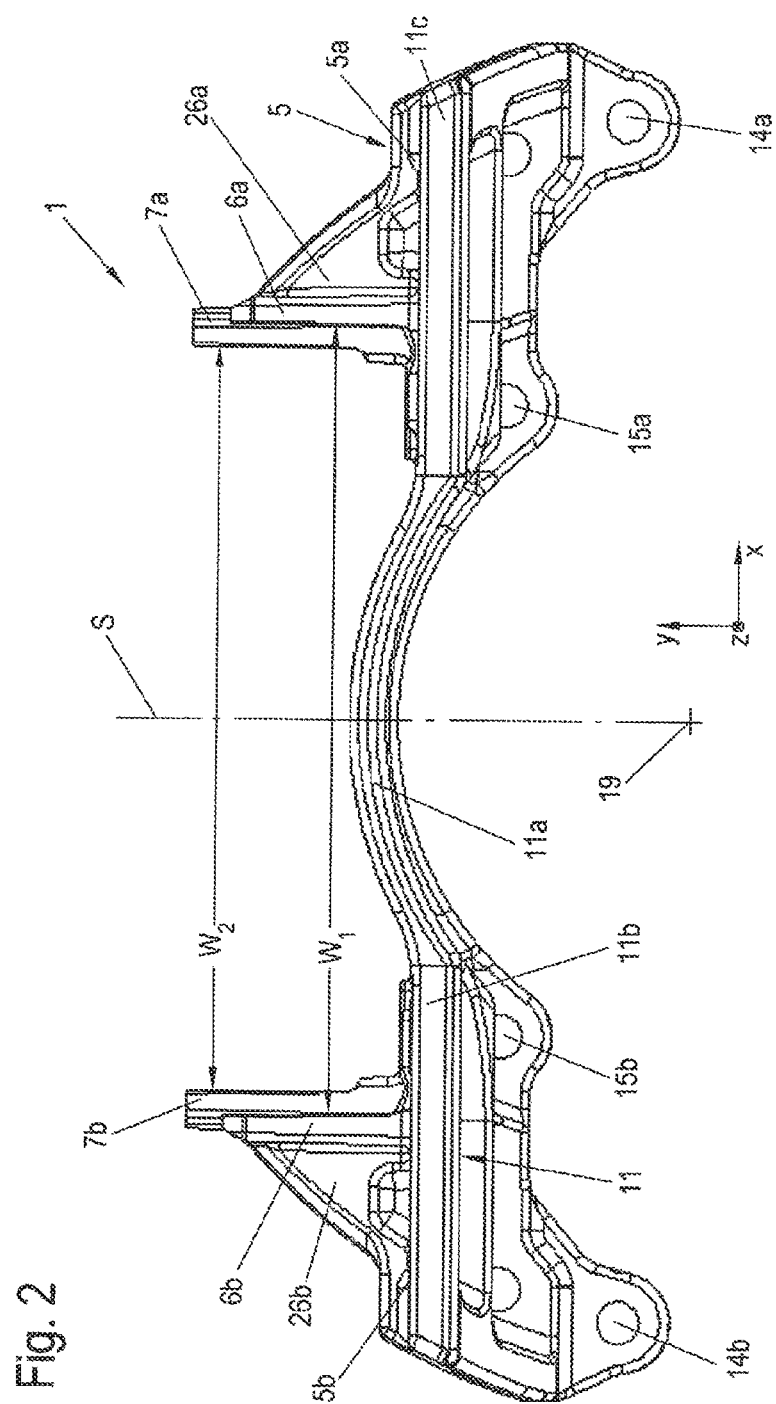
FIG. 2 shows a front view of the brake carrier according to the invention from FIG. 1.
Figure 3:
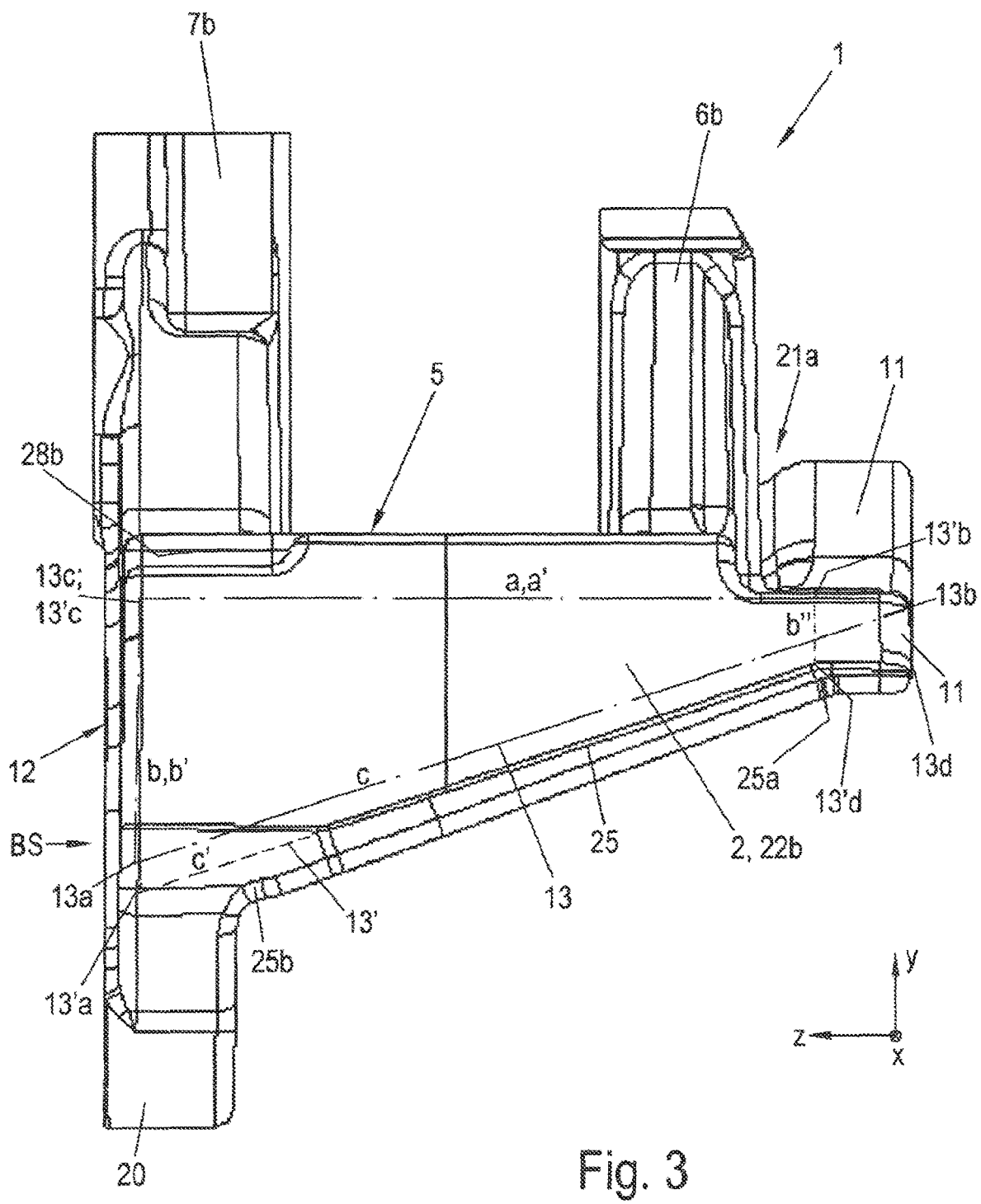
FIG. 3 shows a side view from the left of the brake carrier according to the invention from FIG. 2.

It is clearly illustrated in FIG. 2 and FIG. 3 that the respective inner carrier horns 7*a*, 7*b* are higher, i.e. are larger in terms of size in the y direction with respect to the system of coordinates in FIG. 1, than the outer carrier horns 6*a*, 6*b*. Furthermore, it can be seen that the outer carrier horns 6*a*, 6*b* have a smaller wall thickness than the inner carrier horns 7*a*, 7*b*. The carrier horns 6*a*, 6*b* and 7*a*, 7*b* are in each case machined at their free ends in order to reduce weight.

It is clearly illustrated in FIG. 2 that a clear width "$W_1$" of the brake pad slot formed by the outer carrier horns 6*a*, 6*b* is larger than a clear width "$W_2$" of the brake pad slot formed by the inner carrier horns 7*a*, 7*b*. Using the reduced clear width "$W_2$" of the brake pad slot arranged facing the fastening flange, the rigidity on that side of the brake carrier 1 which faces the fastening flange is advantageously increased. As a result, the mechanical stresses in this region of the brake carrier 1 are likewise advantageously reduced. Accordingly, wall thicknesses can be correspondingly reduced and weight advantageously saved.

FIG. 3 illustrates the triangular frame portion 22*a*, 22*b* (here: 22*b*) in a top view projected in a y-z plane. The arrangement or positioning of the reinforcement rib 11 here below the base surface 5 in regions outside the bridge strut 21*a* can likewise be readily seen. As already explained, the frame portion 22*b* is widened, starting from a side of the disc-encompassing portion 2 that faces away from the fastening flange, from the corner point 13*b* in each case as far as an outer edge 12 of the fastening flange of the brake carrier 1 with the corner point 13*c*. In the embodiment shown, the frame portion 22*b* is widened in such a manner that, starting from that side of the disc-encompassing portion 2 which faces away from the fastening flange or starting from the reinforcement rib 11, the triangular geometrical element 13 or trapezoidal geometrical element 13' is formed toward the outer edge 12 of the fastening flange 20 of the brake carrier 1. The triangular geometrical element 13 is indicated here by chain-dotted lines. The outer contour of the frame portion 22*b* thus substantially follows the triangle or the trapezoid which is not completely shown but is easily conceivable. The same analogously applies to the frame portion 22*a* (not illustrated in FIG. 3) on the opposite side of the disc-encompassing portion 2.

Figure 4:
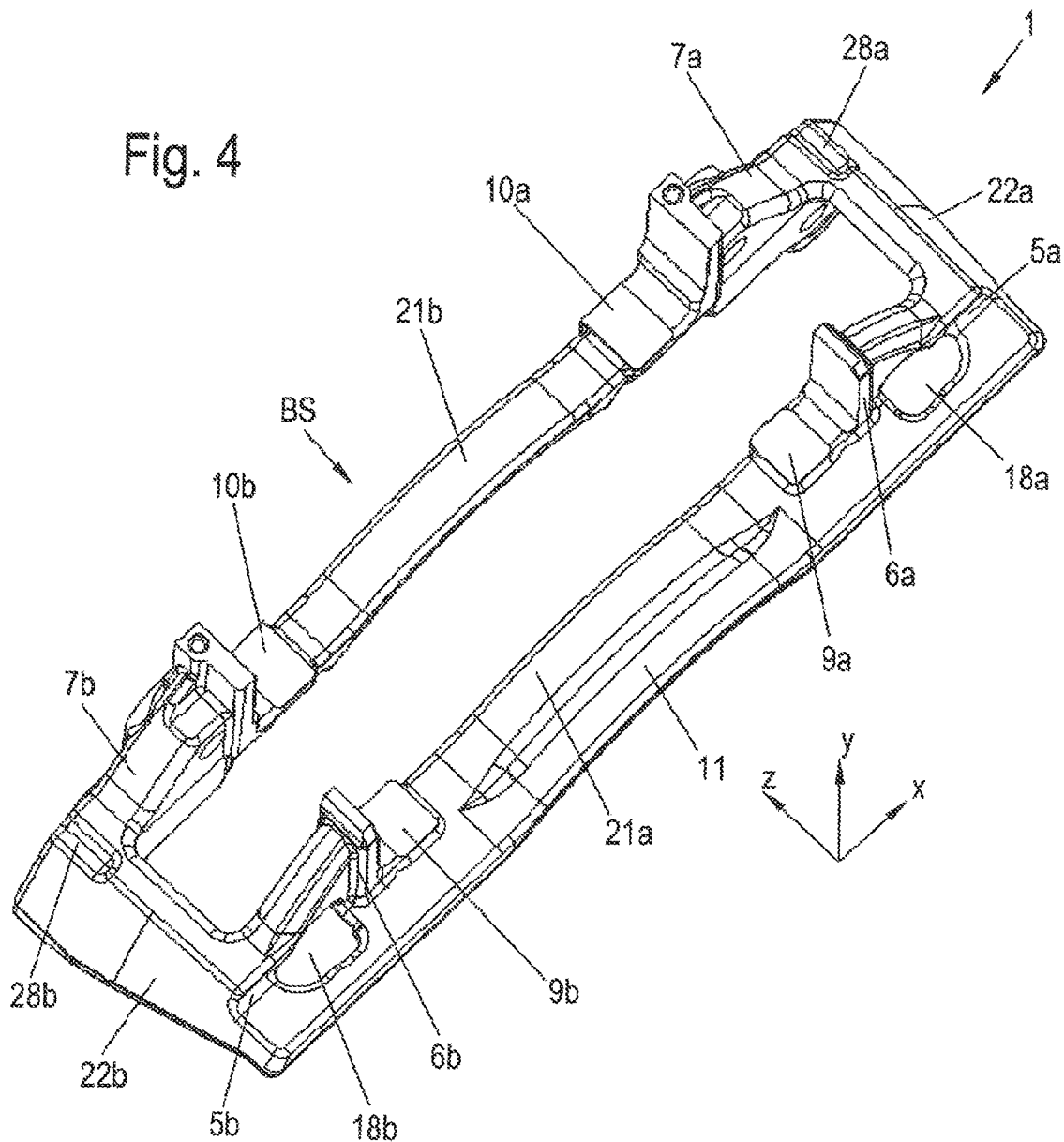
FIG. 4 shows a three-dimensional diametric illustration of the brake carrier according to the invention from FIG. 1.

The apertures 18*a*, 18*b* in the base surface 5 in the region of the outer carrier horns 6*a*, 6*b* can be clearly seen in FIG. 4.

Figure 5:
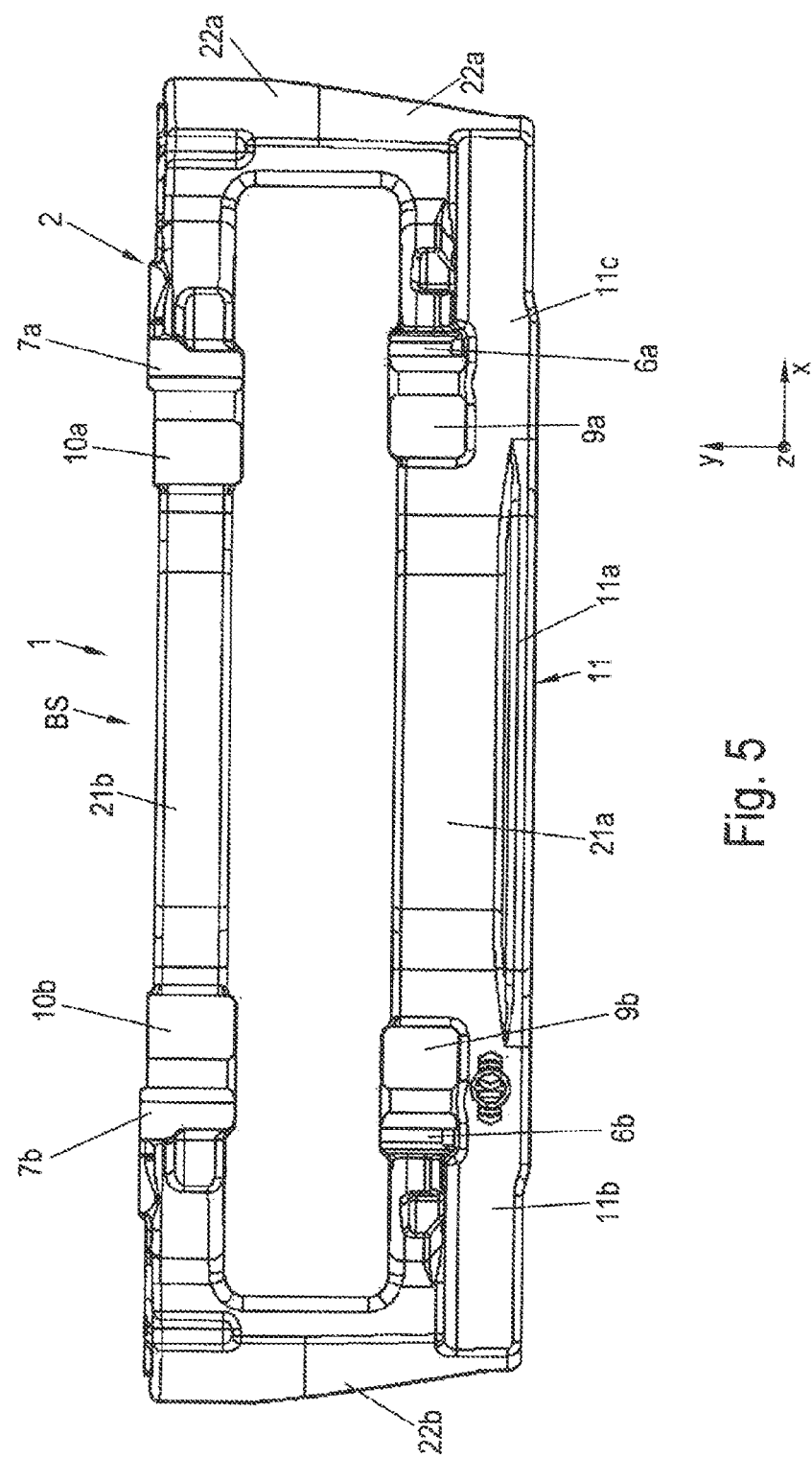
FIG. 5 shows a top view of the brake carrier according to the invention from FIG. 1 or 2.

The brake carrier 1 is illustrated in a top view in FIG. 5. The substantially rectangular shape of the disc-encompassing portion 2 can readily be seen. The disc-encompassing portion 2 is formed from the two parallel bridge struts 21*a*, 21*b* and from the frame portions 22*a*, 22*b* connecting the bridge struts 21*a*, 21*b*. The ends of the bridge struts 21*a*, 21*b* are connected here to the respective corresponding end of the frame portions 22*a*, 22*b* in such a manner that, in the top view illustrated in FIG. 5, the outer contour represents a rectangular shape within a tolerance range. As in the side view illustrated in FIG. 2, the reinforcement rib 11 extends rectilinearly in a plane between those sides of the disc-encompassing portion 2 which face the carrier horns 6a, 6b, with the exception of the region in the axle-engaging-over portion. In the region of the axle-engaging-over portion, the central rib portion 11a of the reinforcement rib 11 is of arc-shaped design, in particular of circular-arc-shaped design.

FIG. 6 illustrates a disc brake 4 with a brake caliper 23 for accommodating an application mechanism, and with the brake carrier 1. A pneumatic brake cylinder 24 can furthermore be seen. The disc brake 4 furthermore has the brake disc 3 and the brake pads 8. The triangular frame portion 22a in a configuration as a triangular geometrical element 13 and the reinforcement rib 11 of the brake carrier 1 can readily be seen.

FIG. 7 shows a top view of a second embodiment of the brake carrier 1 according to the invention. This second embodiment together with variants thereof can be independent embodiments or, as described here, can be formed in combination with the first embodiment. FIG. 7A shows a schematic cross-sectional illustration of the bridge strut 21b facing the fastening flange.

The bridge strut 21a facing away from the fastening flange has a bridge strut portion 210 with a width 211, which is constant over the entire length of the bridge strut 21a in the x direction, in the y direction.

Figure 15:
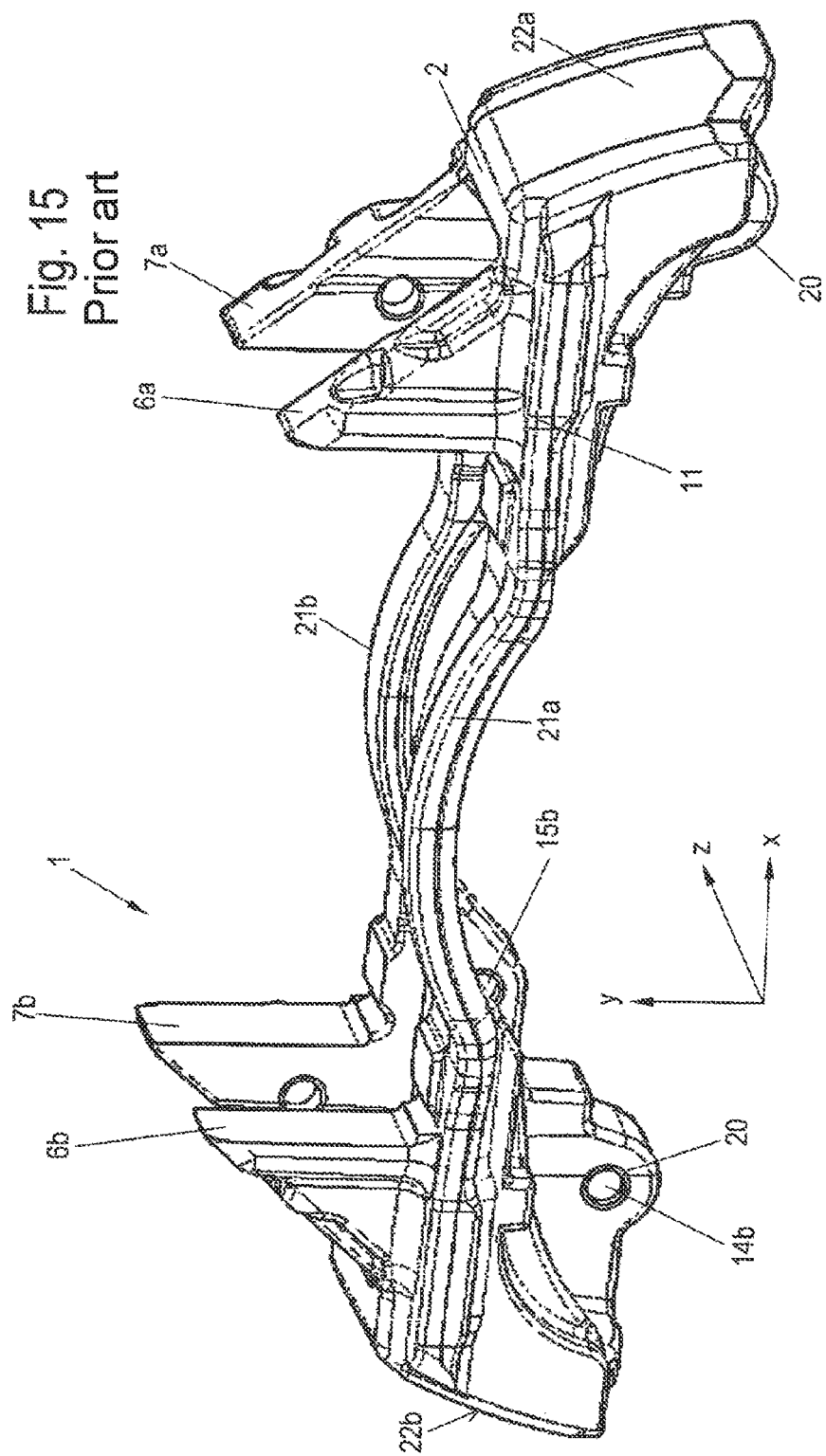
FIG. 15 shows a three-dimensional illustration of a brake carrier according to earlier prior art.
Figure 16:
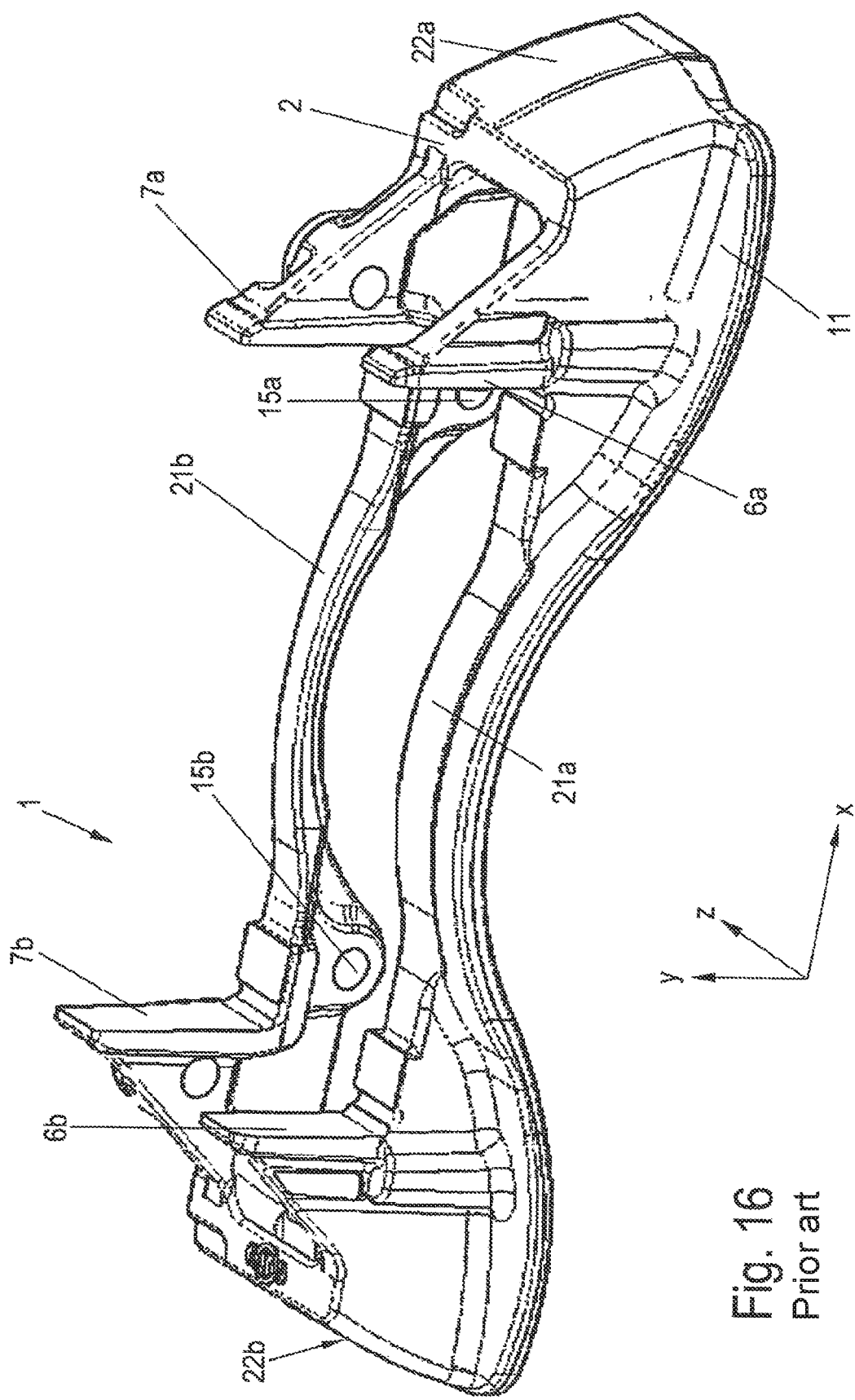
FIG. 16 shows a three-dimensional illustration of a brake carrier according to the prior art described in DE 10 2013 110 159 A1.

The bridge strut 21b facing the fastening flange connects the fastening flanges 20, which have screw-on surfaces for the fastening of the brake carrier 1, to one another. In the prior art which is shown in FIGS. 15 and 16, the bridge strut 21b facing the fastening flange is provided with a substantially square cross section.

In contrast to the first embodiment, the bridge strut 21b facing the fastening flange is, however, designed differently. The bridge strut 21a facing the fastening flange comprises a central bridge strut portion 212, the ends of which are each connected to a run-out portion 213a, 213b. Each run-out portion 213a, 213b is in each case connected via a connection portion 214a, 214b to the respective substructure of the associated support point 10a, 10b of the respective carrier horn 7a, 7b facing the fastening flange. In FIG. 7, the bridge strut 21b facing the fastening flange is thereby attached by the right connection portion 214a below the support point 10a of the carrier horn 7a via the right run-out portion 213a. In a mirror-inverted manner with respect thereto, the bridge strut 21b facing the fastening flange is connected by the left connection portion 214b below the support point 10b of the other carrier horn 7b via the left run-out portion 213b.

In this second embodiment, the run-out portions 213a, 213b each have a constant width in the y direction over their length in the x direction. However, a width 216 of the central bridge strut portion 212 has different values over the length of the bridge strut portion 212 in the x direction. Beginning at a connection point with the right run-out portion 213a (seen here in the negative x direction), the width 216 is initially equal to the width 215 of the right run-out portion 213a, then becomes smaller to approximately half the size toward the center and then increases again as far as a connecting point to the left run-out portion 213b until the width 216 has its starting size. A constriction 216a is thereby formed. As a result, material can also be saved and an overall weight of the brake carrier 1 reduced.

The center of the central bridge strut portion 21b should be understood here as meaning the plane of symmetry S (see FIG. 2) in which a sectional plane VIII-VIII with the coordinate $x_1$ also lies in FIG. 7.

In a further difference, the bridge strut 21b facing the fastening flange is provided with at least one side tilted by an angle. The term "tilted" should be understood as meaning an inclination when the relevant side is inclined with respect to an imaginary horizontal x-z plane by the angle as inclination angle, whereas the term "tilted" indicates an elevation when the relevant side rises to an imaginary horizontal x-z plane by the angle as an elevation angle.

For this purpose, FIGS. 8 to 10 show sectional illustrations of the second embodiment of the brake carrier 1 according to the invention according to FIG. 7. All of the sectional planes each lie in a y-z plane.

FIG. 8 shows a section along the sectional plane VIII-VIII of a coordinate $x_1$ in the x direction according to FIG. 7, wherein the center of the cross section of the bridge strut portion 212 of the bridge strut 21b facing the fastening flange is illustrated in the region of the greatest constriction 216. The cross section of the bridge strut portion 212 and of the run-out portions 213a, 213b is shown in a schematic cross-sectional illustration in FIG. 7a and can be considered in simplified form as a square cross section which, in this example, forms a right-angled trapezoid with the corner points A, B, C, D as a simplified cross section. Simplification of the cross section should be understood here as meaning that, for the sake of simplicity, the rounded portion of the rounded corners or edges shown is not taken into consideration for this description.

The two base sides of said trapezoid A, B, C, D run parallel in the y direction as an outer side 219 and an inner side 220, wherein the longer base side as outer side 219 points toward the fastening side BS of the brake carrier 1. In this embodiment, the outer side 219 and the inner side 220 run parallel to each other. The limb which is connected at a right angle to said base side/outer side 219 forms a lower side 218 and runs parallel to the z axis. An upper side 217 of the bridge strut portion 212 is inclined or tilted from the z axis at an angle $\alpha(x_1)$ about the corner point C and forms the second limb of the trapezoid. The angle $\alpha(x_i)$ is thereby an angle of inclination of the upper side 217 with respect to an imaginary x-z plane which runs through the corner point C.

The thus inclined upper side 217 of the bridge strut portion 212 is inclined inward and downward in this example. That is to say, inward between the carrier horns 6b and 7b or 6a and 7a. This angle of inclination $\alpha(x_1)$ lies within a range of approximately 8° to 10° and is preferably 9° here.

FIG. 9 shows a section along a sectional plane IX-IX of a coordinate $x_2$ in the x direction according to FIG. 7. In contrast to FIG. 8, the cross section of the central bridge strut portion 212 is enlarged here because of the larger width 216. The angle of inclination $\alpha(x_2)$ also lies within a range of approximately 8° to 10° and is here, however, preferably 9.4°.

The section in FIG. 10 runs along a sectional plane X-X of a coordinate $x_3$ in the x direction according to FIG. 7. The cross section shown of the left run-out portion 213b has the full width 215d of the left run-out portion 213b in the region of a transition to the left connection portion 214b. The cross section has now transferred from a trapezoidal shape into a larger shape which is assembled from the original trapezoidal shape and further geometrical basic shapes, which will not be dealt with further here. The angle of inclination $\alpha(x_3)$ also lies here within a range of approximately 8° to 10° and here is, however, preferably 9.2°.

The above description of the inclined upper side 217 also applies to the right part (not described) of the bridge strut 21b facing the fastening flange. Alternatively, however, it is also conceivable for the inclination of the right upper side 217 not to be formed symmetrically with respect to the left inclined upper side 217, but rather differently.

FIG. 11 shows a top view of a variant of the second embodiment of the brake carrier according to the invention according to FIG. 7. FIG. 11A shows a schematic cross-sectional illustration of the bridge strut 21b facing the fastening flange.

In contrast to the second embodiment according to FIG. 7, in this variant the bridge strut 21b facing the fastening flange has a width 215 which remains invariable over the entire length of the central bridge strut portion 212 including the run-out portions 213a, 213b.

Figure 12:
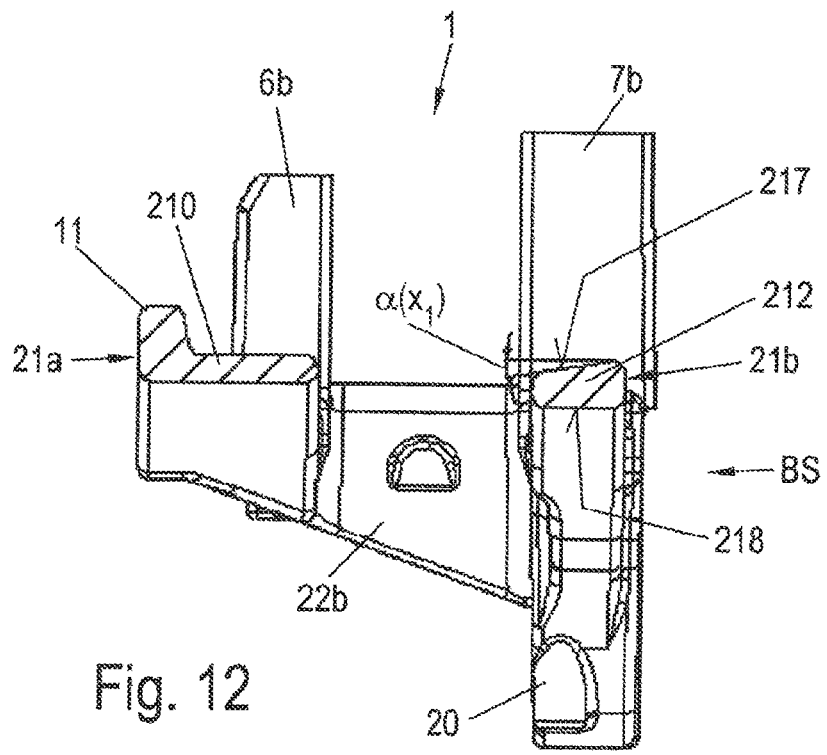

FIGS. 12 to 13 are sectional illustrations of the variant of the second embodiment of the brake carrier 1 according to FIG. 11. All of the sectional planes also each lie here in a y-z plane and have the same coordinates $x_{1-3}$.

Also in this variant, the bridge strut 21b facing the fastening flange is provided with at least one tilted side, here preferably the upper side 217.

Figure 13B:
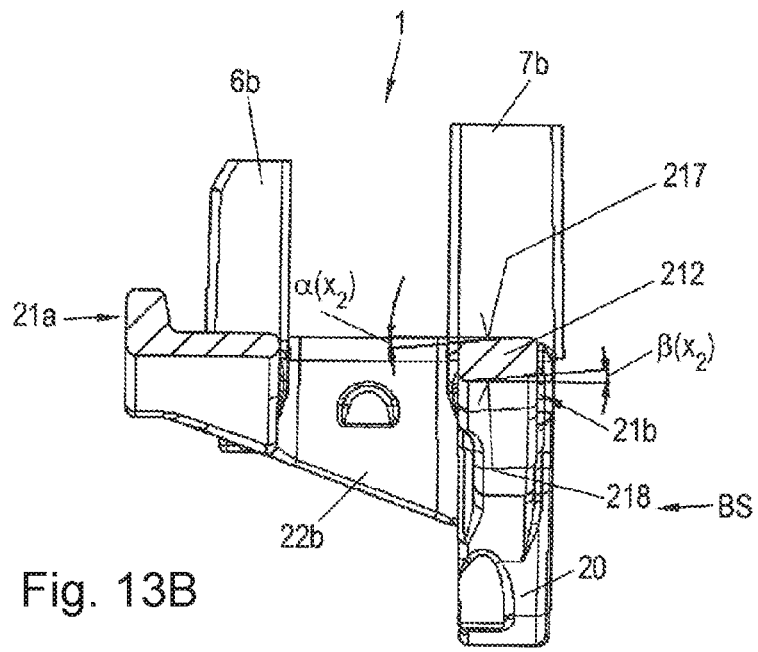
Figure 13C:
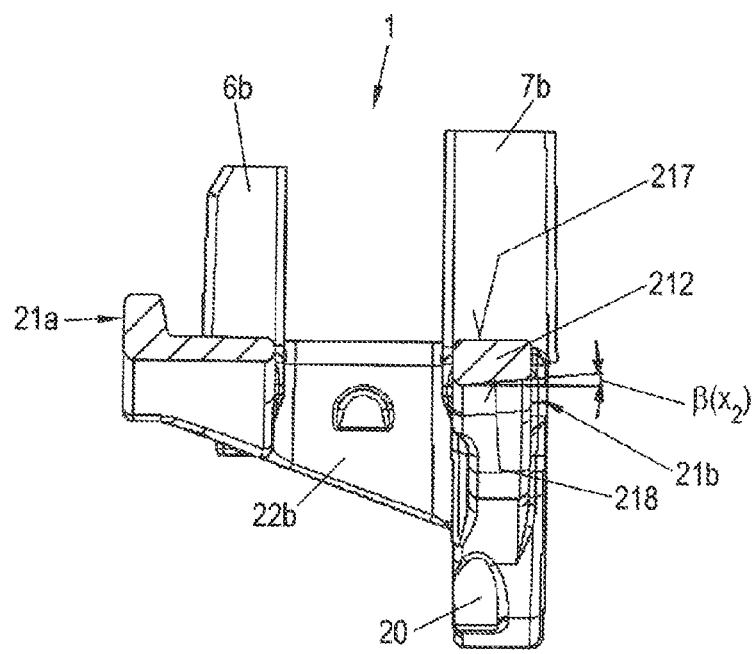
Figure 14:
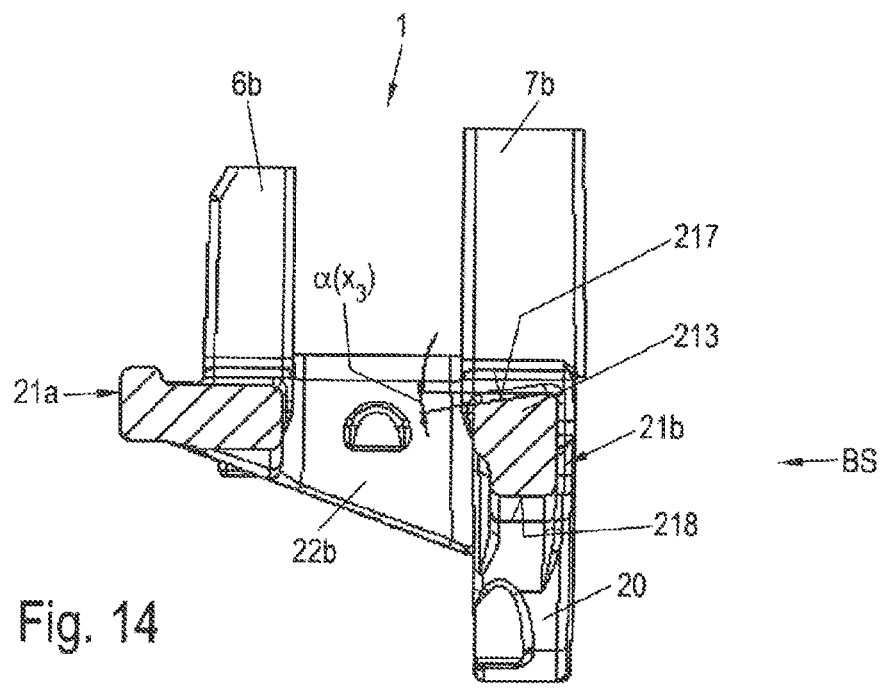

In this variant, the angle $\alpha(x_1)$ in FIG. 12 is 9°, changes to $\alpha(x_2)=9.4°$ in FIG. 13 and becomes somewhat smaller again in FIG. 14 with $\alpha(x_3)=9.2°$.

Figure 12A:
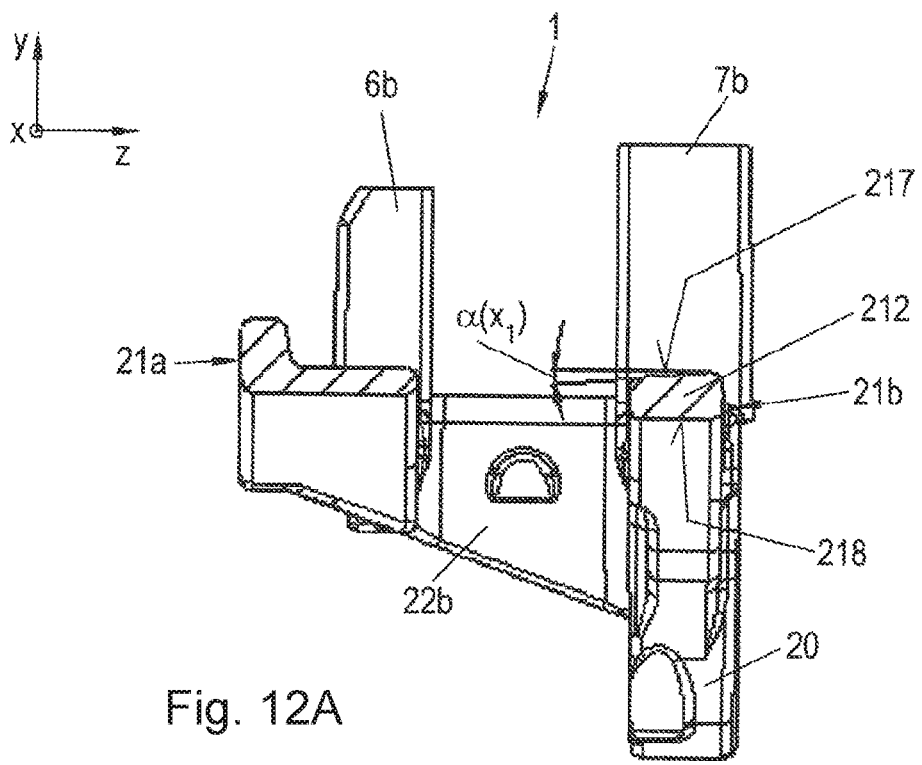
Figure 14A:
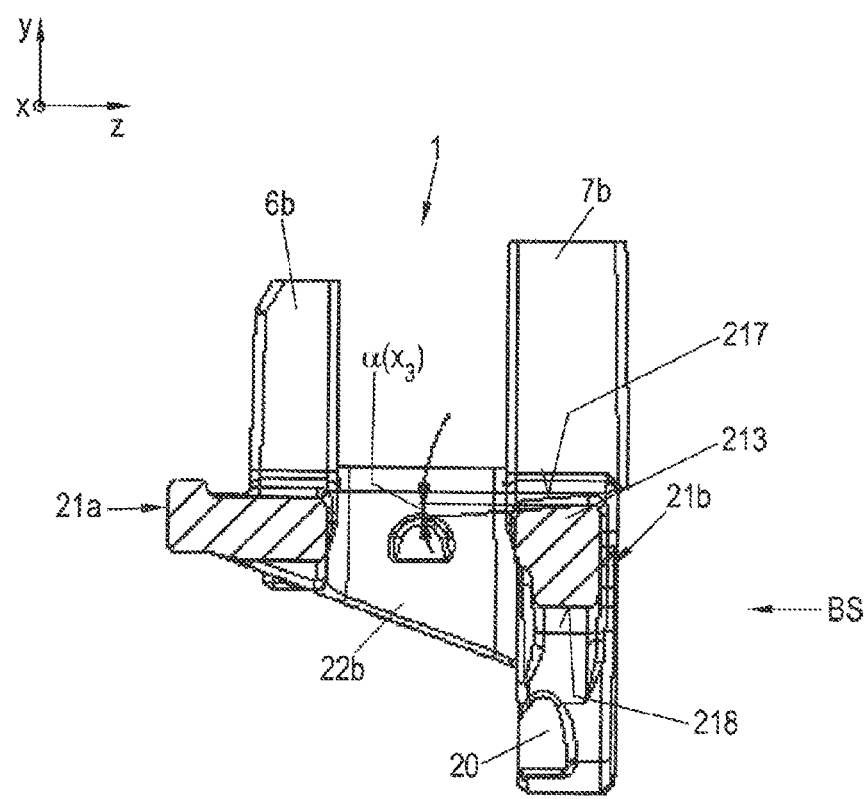

FIGS. 12A, 13A and 14A show further variants of the angle $\alpha(x_i)$ by way of example. FIG. 12A shows $\alpha(x_1)=5°$ and FIG. 13A shows $\alpha(x_2)=5.2°$. However, the angle $\alpha(x_i)$ does not become smaller again here in the third position where x=3, but is increased to $\alpha(x_3)=5.3°$, as FIG. 14A shows.

During operation of the disc brake to which the brake carrier 1 is assigned, increased stresses customarily occur which may lead to a substantial reduction in service life, particularly if said increased stresses are concentrated on the inside or outside at the edges (radii) of the bridge strut 21b in the run-out portions 213a and 213b. A remedy in this regard is now provided by the inclined or tilted upper side 217 of the bridge strut 21b facing the fastening flange. It is therefore possible to distribute the stresses in a sheet-like manner over the cross section, and to reduce the stress and therefore also the weight of the brake carrier 1. The angle $\alpha(x_i)$ can extend here over the entire bridge strut 21b and move within a range of 1° to 20°. In a preferred embodiment, the angle $\alpha(x_i)$ is 5° to 12°, and approximately 9° to 9.4° in the example shown. The angle $\alpha(x_i)$ can also change variably over the entire course of the bridge strut 21b depending on the coordinate x. The position of the stresses plays a crucial role here. The angle $\alpha(x_i)$ has to be selected in such a manner that material is removed in the region of the stress concentration.

Alternatively, it is also conceivable for the lower side 218 of the bridge strut 21b to be solely or else additionally tilted or inclined in order possibly also to equalize stress concentrations on the lower side 218. This is explained in more detail below.

Figure 12B:
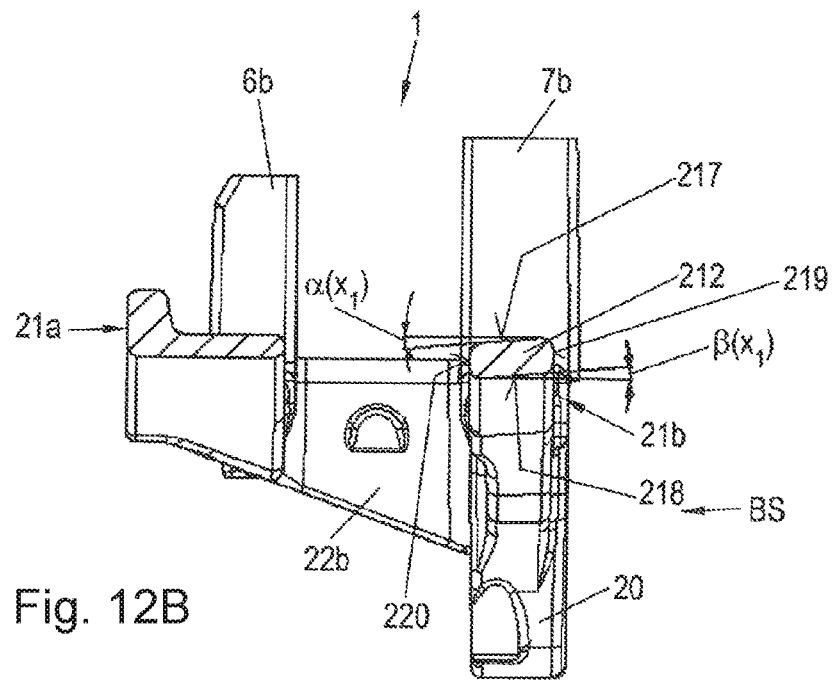

FIGS. 12B, 13B and 14B show such a possibility, wherein the lower side 218 of the bridge strut 21b facing the fastening flange is also inclined in addition to the inclined upper side 217. FIG. 11A shows a schematic cross-sectional illustration.

In this variant, the lower side 218 is inclined upward at an angle $\beta(x_1)$ with respect to the z axis about the corner point A, as can best be seen from FIG. 11A. The outer side 219 and the inner side 220 run here in the y direction and parallel to each other. For the situation in which the angles $\alpha(x_i)$ and $\beta(x_i)$ are identical in size, the cross section of the central bridge strut portion 212 forms a parallelogram, as seen in simplified form.

In the example according to FIG. 12B, $\alpha(x_1)=\beta(x_1)=5°$ and are therefore the same size. At the coordinate $x_2$, which FIG. 13B shows, $\alpha(x_2)=5.2°$, wherein $\beta(x_2)=5.4°$ is larger. The angle $\alpha(x_i)$ in the third position where x=3 becomes smaller again here: $\alpha(x_3)=5.1°$. However, $\beta(x_3)$ has become substantially larger: $\beta(x_3)=7.2°$ as emerges from FIG. 14B.

Figure 12C:
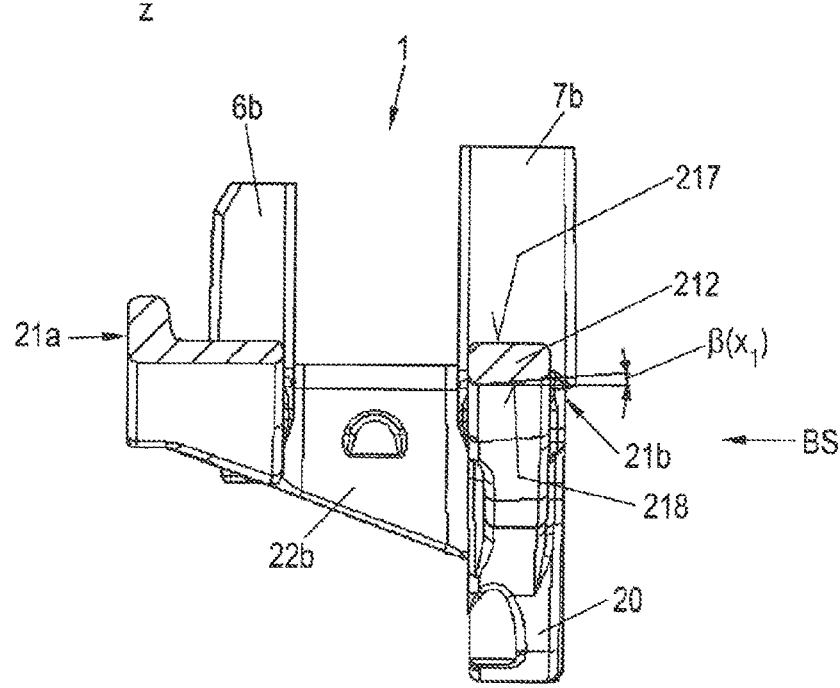

FIGS. 12C, 13C and 14C show a further variant in which only the lower side 218 is inclined. In this case, the values of the angle $\beta(x_i)$ have the same values as in the variant according to FIGS. 12B, 13C and 14C, i.e. increased from the center of the bridge strut 21 facing the fastening flange, toward the respective end of said bridge strut.

The invention is not restricted by the embodiments described above. The invention can be modified within the scope of the appended claims.

For example, it is thus conceivable for all of the sides of the bridge strut 21b facing the fastening flange to be able to be inclined.

Of course, other cross sections of the bridge strut 21b facing the fastening flange than the cross sections described above are also conceivable.

It is also possible for the bridge strut 21b facing the fastening flange to have a type of twisting. The twisting here may be formed symmetrically, but also asymmetrically, with respect to the axis of symmetry.

It is also conceivable for the upper side 217 to be inclined outward and/or for the lower side to be inclined inward.

The constriction 216a can also be present on the bridge strut 21a facing away from the fastening flange.

Furthermore, it is also conceivable for the respective bridge strut 21a, 21b to have more than one constriction 216a.

The constriction(s) 216a can also be formed on one side with respect to an imaginary longitudinal axis of the respective bridge strut 21a, 21b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Brake carrier
2 Disc-encompassing portion
3 Brake disc
4 Disc brake
5 Base surface
5a, 5b Step
6a, 6b Carrier horn
7a, 7b Carrier horn
8 Brake pad
9a, 9b Support point
10a, 10b Support point
11 Reinforcement rib
11a, 11b, 11c Rib portion
12 Outer edge
13, 13' Geometrical element
13a, 13b, 13c, 13d Corner point
13'a, 13'b, 13'c, 13'd Corner point
14a, 14b Fastening point
15a, 15b Fastening point 16a, 16b Fastening point
17a, 17b Pocket
18a, 18b Aperture
19 Brake-disc axis of rotation
20 Fastening flange
21a, 21b Bridge strut
22a, 22b Frame portion
23 Brake caliper
24 Brake cylinder
25 Edge
25a, 25b Transition portion
26a, 26b Support wall
27a, 27b Support wall
28a, 28b Recess
210 Bridge strut portion
211 Width
212 Bridge strut portion
213a, 213b Run-out portion
214a, 214b Connection portion
215, 216 Width
216a Constriction
217 Upper side
218 Lower side
219 Outer side
220 Inner side
BS Fastening side
$W_1$ Clear width
$W_2$ Clear width
S Plane of symmetry
x, y, z Coordinates
$\alpha(x_i)$, $\beta(x_i)$ Angle

What is claimed is:

1. An integral brake carrier for a vehicle disc brake having a brake disc, comprising:
a disc-encompassing frame portion having two parallel bridge struts and two frame portions arranged parallel to a brake-disc axis of rotation and connected to the two bridge struts; and
a fastening flange configured for attaching the brake carrier to an axle flange of a vehicle axle,
wherein
at least one of the two frame portions widen in a direction from a side of the disc-encompassing portion facing away from the fastening flange, to an outer edge of the fastening flange, the widening being an increase in distance from a plane of the disc-encompassing portion,
the widening is such that a geometrical element is formed between the side of the disc-encompassing portion that faces away from the fastening flange, and an outer edge of the fastening flange of the brake carrier,
the geometrical element is triangular with a side of the frame portion which faces the fastening flange being a shortest side of the triangular geometrical element, or is trapezoidal with a side of the frame portion which faces the fastening flange being a largest base side of the trapezoidal geometrical element,
the brake carrier has a reinforcement rib on the side facing away from the fastening flange which includes a central, curved rib portion, two rib portions having a rectilinear profile, and the central, curved rib portion and the two rectilinear rib portions form a closed contour line,
the contour line of the reinforcement rib begins at one of the two frame portions and ends at the other of the two frame portions,
the two rib portions having a rectilinear profile extend along the contour line parallel to, or in, a plane of a base surface of the disc-encompassing portion,
the central, curved rib portion extends along the contour line with the bridge strut facing away from the fastening flange across a plane of symmetry of the brake carrier, and
a radially-lower edge of the brake carrier at the geometrical element extends in a straight line, transversely relative to the brake-disc axis of rotation, between a region directly under one of the two rectilinear rib portions of the reinforcing rib on the side facing away from the fastening flange to a region under the one of the two parallel bridge struts on the fastening flange side of the carrier.

2. The brake carrier as claimed in claim 1, wherein at least one of the frame portions has a lower edge which has a rectilinear profile without steps.

3. The brake carrier as claimed in claim 1, wherein the brake carrier has two carrier horns on a side of the brake carrier that faces away from the fastening flange, and two carrier horns on a side of the brake carrier that faces the fastening flange.

4. The brake carrier as claimed in claim 3, wherein the carrier horns on the side of the brake carrier that faces the fastening flange are higher than the carrier horns on the side of the brake carrier that faces away from the fastening flange.

5. The brake carrier as claimed in claim 4, wherein the two carrier horns on the side of the brake carrier that faces the fastening flange each have an L-shaped cross section.

6. The brake carrier as claimed in claim 5, wherein the L-shaped cross section of the carrier horns on the side of the brake carrier that faces the fastening flange have an axial thickness greater than an axial thickness of the carrier horns on the side of the brake carrier that faces away from the fastening flange.

7. The brake carrier as claimed in claim 1, wherein the central, curved rib portion of the reinforcement rib extends along the contour line in a circular-arc-shaped manner in a region of an axle-engaging-over portion of the brake carrier.

8. The brake carrier as claimed in claim 7, wherein the reinforcement rib is mirror-symmetrical with respect to the plane of symmetry.

9. The brake carrier as claimed in claim 1, wherein the reinforcement rib is arranged above axle fastening points of the fastening flange.

10. The brake carrier as claimed in claim 1, wherein the brake carrier has pockets arranged in regions of the fastening flange adjacent to the fastening points, below the carrier horns on a brake-disc-facing side of the side of the disc-encompassing portion that faces the fastening flange.

11. The brake carrier as claimed in claim 1, wherein the brake carrier has one or more apertures extending through at least one of the base surface and the reinforcing rib in a region adjacent to the carrier horns on the side of the disc-encompassing portion that faces away from the fastening flange.

12. The brake carrier as claimed in claim 10, wherein the brake carrier has one or more apertures extending through at least one of the base surface and the reinforcing rib in a region adjacent to the carrier horns on the side of the disc-encompassing portion that faces away from the fastening flange.

13. The brake carrier as claimed in claim 11, wherein
the one or more apertures are two apertures arranged mirror-symmetrically with respect to the plane of symmetry.

14. The brake carrier as claimed in claim 13, wherein
a clear width of a brake pad slot formed between the carrier horns on the side that faces away from the fastening flange is greater than a clear width of a brake pad slot between the carrier horns on the side that faces the fastening flange.

15. The brake carrier as claimed in claim 1, wherein
at least one of the bridge struts is provided with at least one side tilted by an angle away from a right angle relative to a side facing the brake disk.

16. The brake carrier as claimed in claim 15, wherein
the angle is on at least the bridge strut on the side that faces the fastening flange.

17. The brake carrier as claimed in claim 16, wherein
the angle on the bridge strut on the side that faces the fastening flange is on the upper side of the bridge strut, and
the angle is tilted away from a horizontal plane which lies parallel to a plane of the base surface of the disc-encompassing portion.

18. The brake carrier as claimed in claim 16, wherein
the angle on the bridge strut on the side that faces the fastening flange is on the lower side of the bridge strut, and
the angle is tilted away from a horizontal plane which lies parallel to a plane of the base surface of the disc-encompassing portion.

19. The brake carrier as claimed in claim 16, wherein
the angle 1° to 20°.

20. The brake carrier as claimed in claim 16, wherein
the angle 5° to 12°.

21. The brake carrier as claimed in claim 16, wherein
the angle varies over a length of the bridge strut on the side that faces the fastening flange.

22. The brake carrier as claimed in claim 14, wherein
at least one of the bridge struts has at least one constriction.

23. The brake carrier as claimed in claim 22, wherein
the at least one constriction is symmetrical about the plane of symmetry.

24. A disc brake of a vehicle, comprising:
a brake caliper; and
a brake carrier having
a disc-encompassing frame portion having two parallel bridge struts and two frame portions arranged parallel to a brake-disc axis of rotation and connected to the two bridge struts; and
a fastening flange configured for attaching the brake carrier to an axle flange of a vehicle axle,
wherein
at least one of the two frame portions widen in a direction from a side of the disc-encompassing portion facing away from the fastening flange, to an outer edge of the fastening flange, the widening being an increase in distance from a plane of the disc-encompassing portion,
the widening is such that a geometrical element is formed between the side of the disc-encompassing portion that faces away from the fastening flange, and an outer edge of the fastening flange of the brake carrier,
the geometrical element is triangular with a side of the frame portion which faces the fastening flange being a shortest side of the triangular geometrical element, or is trapezoidal with a side of the frame portion which faces the fastening flange being a largest base side of the trapezoidal geometrical element,
the brake carrier has a reinforcement rib on the side facing away from the fastening flange which includes a central, curved rib portion, two rib portions having a rectilinear profile, and the central, curved rib portion and the two rectilinear rib portions form a closed contour line,
the contour line of the reinforcement rib begins at one of the two frame portions and ends at the other of the two frame portions,
the two rib portions having a rectilinear profile extend along the contour line parallel to, or in, a plane of a base surface of the disc-encompassing portion,
the central, curved rib portion extends along the contour line with the bridge strut facing away from the fastening flange across a plane of symmetry of the brake carrier, and
a radially-lower edge of the brake carrier at the geometrical element extends in a straight line, transversely relative to the brake-disc axis of rotation, between a region directly under one of the two rectilinear rib portions of the reinforcing rib on the side facing away from the fastening flange to a region under the one of the two parallel bridge struts on the fastening flange side of the carrier.

\* \* \* \* \*